(12) United States Patent
Ito

(10) Patent No.: US 6,980,320 B2
(45) Date of Patent: Dec. 27, 2005

(54) IMAGE FORMING APPARATUS, METHOD OF CONTROLLING THE SAME, PROGRAM, AND STORAGE MEDIUM

(75) Inventor: Hirohiko Ito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 813 days.

(21) Appl. No.: 10/156,943

(22) Filed: May 30, 2002

(65) Prior Publication Data

US 2002/0186413 A1 Dec. 12, 2002

(30) Foreign Application Priority Data

Jun. 7, 2001 (JP) ............................. 2001-172094

(51) Int. Cl.[7] .......................... G06F 13/00; G06F 15/00
(52) U.S. Cl. ...................... 358/1.18; 358/1.2; 358/2.1; 358/462
(58) Field of Search ............................... 358/1.18, 1.2, 358/2.1, 462

(56) References Cited

U.S. PATENT DOCUMENTS 6,362,900 B1 * 3/2002 Squilla et al. .............. 358/442
2003/0189730 A1 * 10/2003 Enomoto ................... 358/3.26

* cited by examiner

*Primary Examiner*—Edward Coles
*Assistant Examiner*—Alan Rahimi
(74) *Attorney, Agent, or Firm*—Fitzpatrick, Cella, Harper & Scinto

(57) ABSTRACT

In an image forming apparatus incorporating an image forming unit capable of execution in a layout print mode in which a plurality of pages of image data is formed on a single sheet, whether or not to permit the image forming unit to execute in the layout print mode for a plurality of sets of image data to be laid out in the layout print mode is controlled based on the image property information of the plurality of image data, so that layout functions desired by users are provided and ease of operation by the users is improved without incurring excessive processes or additional cost.

12 Claims, 18 Drawing Sheets

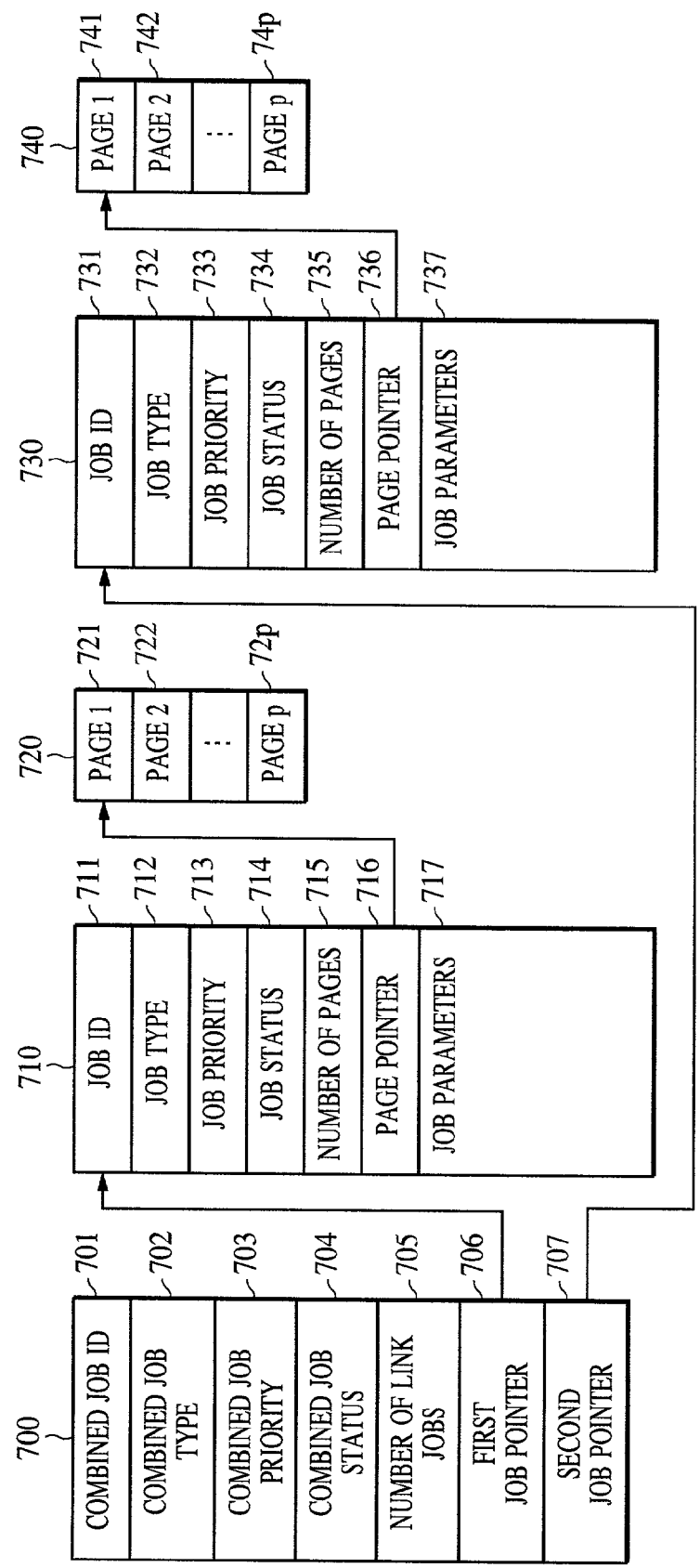

|  | FIRST FACE : LEFT | FIRST FACE : RIGHT | SECOND FACE : LEFT | SECOND FACE : RIGHT |
|---|---|---|---|---|
| FIRST SHEET | 4 | 5 | 6 | 3 |
| SECOND SHEET | 2 | 7 | 8 | 1 |
| ⋮ | | | | |
| (n-1)-TH SHEET | | | | |
| n-TH SHEET | | | | |

FIG. 18

[DETAIL INFORMATION]
- 1901 — ■ RECEIPT NUMBER ▷ 1234
- 1902 — ■ RECEIPT TIME ▷ 2000 12/28 15:37
- 1903 — ■ JOB TYPE ▷ SCAN DOCUMENT
- 1904 — ■ JOB NAME ▷ 12345678901234567890123456 78
- 1905 — ■ USER NAME ▷ 12345678901234567890123456 78
- 1906 — ■ NUMBER OF PAGES ▷ 1234
- 1907 — ■ NUMBER OF COPIES ▷ 1
- 1908 — ■ SIZE ▷ 11×17
- 1909 — ■ RESOLUTION ▷ 600dpi

CLOSE — 1910

SYSTEM STATUS

FIG. 20

| DIRECTORY INFORMATION |
|---|
| FIRST DATA PROCESSING PROGRAM PROGRAM CODE SET CORRESPONDING TO STEPS OF FLOWCHART SHOWN IN FIG. 6 |
| SECOND DATA PROCESSING PROGRAM PROGRAM CODE SET CORRESPONDING TO STEPS OF FLOWCHART SHOWN IN FIG. 9 |
| THIRD DATA PROCESSING PROGRAM PROGRAM CODE SET CORRESPONDING TO STEPS OF FLOWCHART SHOWN IN FIG. 19 |
| |

IMAGE FORMING APPARATUS, METHOD OF CONTROLLING THE SAME, PROGRAM, AND STORAGE MEDIUM

BACKGROUND OF THE INVENTION

1. Field of the Invention

The present invention relates to an image forming apparatus to and from which various image data is input and output via a storage medium, a method of controlling the same, a program, and a storage medium.

2. Description of the Related Art

With the recent trend of digitization of copying machines, multifunction machines having a plurality of functions, for example, a copying machine also capable of facsimile transmission using a scanner and a printer thereof, a PDL (Page Description Language) printer, etc., have been put to practical use.

Such a multifunction machine allows not only execution of a single function such as copying function, facsimile function, PDL print function, etc., but also execution of a combination of a plurality of functions, for example, transmission of rasterized PDL image data by facsimile.

Furthermore, by connecting a multifunction machine to a LAN (Local Area Network), the functions of the multifunction machine can be used from a computer, etc.

Such a multifunction machine incorporates a hard disk with a large capacity for storing image data from a scanner, rasterized PDL image data, documents received via facsimile, etc., so that desired functions can be provided by combining various functions including printing of the stored image data, transmission of the image data via facsimile, and transferring the image data to a computer via a network.

Furthermore, an image forming apparatus has been proposed in which a finisher is incorporated in a printer of a copying machine, and two pages of image of an original document are formed on each face of a sheet so that the pages will be in order when a plurality of sheets are center folded and saddle stitched (binding layout). That is, the proposed image forming apparatus has a layout function for forming a plurality of pages of image on one sheet.

However, in the binding layout function of the conventional image forming apparatus, it is desired that the resolutions of the plurality of pages of image data be the same. A possible approach is to convert the resolutions so that the resolutions of all the image data match. However, this approach requires a conversion circuit and a page memory for converting resolutions before image formation, which is likely to incur excessive processes and additional cost.

SUMMARY OF THE INVENTION

Accordingly, it is an object of the present invention to provide an image forming apparatus, a method of controlling the same, a program, and a storage medium that serve to solve the problems described above.

It is another object of the present invention to provide an image forming apparatus, a method of controlling the same, a program, and a storage medium that provide layout functions desired by users without incurring excessive processes or additional cost and that also improve ease of operation by the users.

To these ends, the present invention, in one aspect thereof, provides an image forming apparatus including an input unit for inputting a plurality of image data; a layout unit for laying out image data input by the input unit; an image forming unit for forming an image on a sheet based on image data that has been laid out by the layout unit; and a restricting unit for restricting the layout means if the resolution differs among the plurality of image data input by the input means.

The present invention, in another aspect thereof, provides an image forming apparatus including a storage control unit for storing input image data in a storage unit capable of storing a plurality of image data; a management unit for managing image data stored in the storage unit as a document; a layout unit for laying out a plurality of image data stored in the storage unit; an image forming unit for forming an image on a sheet based on the image data that has been laid out by the layout unit; a document selecting unit for selecting a document stored in the storage unit and managed by the management unit; a control unit for controlling the layout unit so as to lay out the document selected by the document selecting unit and for controlling the image forming unit so as to form an image, according to an instruction; and an inhibiting unit for inhibiting the layout unit if the resolution differs among the plurality of image data stored in the storage unit and selected by the document selecting unit for layout by the layout unit.

The present invention, in another aspect thereof, provides an image forming apparatus including a storage control unit for storing input image data in a storage unit capable of storing a plurality of image data; a management unit for managing image data stored in the storage unit as a document; a layout unit for laying out a plurality of image data stored in the storage unit; an image forming unit for forming an image on a sheet based on the image data that has been laid out by the layout unit; a document selecting unit that allows selection of a plurality of documents managed by the management unit; a control unit for controlling the layout unit to lay out the plurality of documents selected by the document selecting unit and for controlling the image forming unit to simultaneously print the plurality of documents, according to an instruction; and an inhibiting unit for inhibiting the layout unit if the resolution differs among the plurality of image data or documents stored in the storage unit and selected by the document selecting unit.

The present invention, in another aspect thereof, provides an image forming apparatus that allows an image forming unit to execute in a layout print mode in which a plurality of pages of image data is formed on a sheet, the image forming apparatus including a control unit for controlling whether or not to permit the image forming unit to execute in the layout print mode for a plurality of image data to be laid out in the layout print mode, based on image property information of the plurality of image data.

The present invention, in another aspect thereof, provides a method of controlling an image forming apparatus that allows an image forming unit to execute in a layout print mode in which a plurality of pages of image data is formed on a single sheet, the method including the step of controlling whether or not to permit the image forming unit to execute in the layout print mode for a plurality of image data to be laid out in the layout print mode, based on image property information of the plurality of image data.

The present invention, in another aspect thereof, provides a computer-readable storage medium storing a program for executing, by an image forming apparatus that allows an image forming unit to execute in a layout print mode in which a plurality of pages of image data are formed on a single sheet, the step of controlling whether or not to permit the image forming unit to execute in the layout print mode for a plurality of image data to be laid out in the layout print mode, based on image property information of the plurality of image data.

Further objects, features and advantages of the present invention will become apparent from the following description of the preferred embodiments with reference to the attached drawings.

BRIEF DESCRIPTION OF THE DRAWINGS

FIG. 7 is a diagram showing an example of a combined job management table in an image forming apparatus according to the present invention.

FIG. 18 is a schematic diagram showing an example screen of a touch panel in the operation unit shown in FIG. 11.

FIG. 20 is a diagram showing a memory map of a storage medium storing data processing programs that can be read by an image forming apparatus according to the present invention.

DESCRIPTION OF THE PREFERRED EMBODIMENTS

First Embodiment

Figure 1:
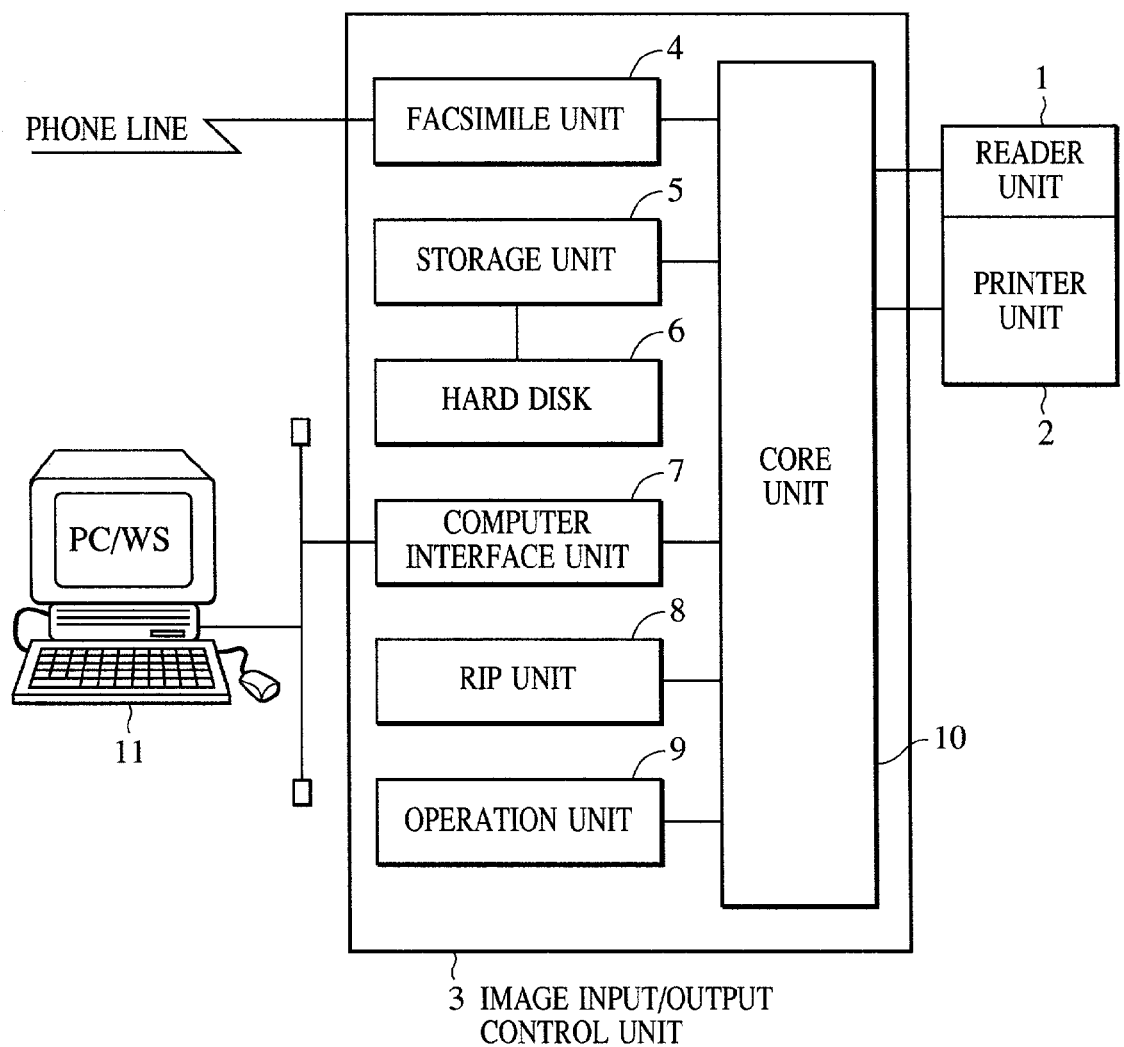
FIG. 1 is a block diagram showing the construction of an image forming apparatus according to a first embodiment of the present invention.

FIG. 1 is a block diagram showing the construction of an image forming apparatus according to a first embodiment of the present invention.

Referring to FIG. 1, a reader unit 1 reads an image of an original document and outputs image data corresponding to the image of the original document to an image input/output control unit 3. A printer unit 2 records an image corresponding to the image data from the image input/output control unit 3 on a recording sheet. The image input/output control unit 3 is connected to the reader unit 1 and the printer unit 2, and it includes a facsimile unit 4, a storage unit 5, a computer interface unit 7, an RIP unit 8, an operation unit 9, and a core unit 10.

The facsimile unit 4 expands compressed image data received via a phone line and transfers the expanded image data to the core unit 10. The facsimile unit 4 also compresses image data transferred from the core unit 10 and transmits the compressed image data via a phone line. The image data to be transmitted/received can be temporarily stored in a hard disk 6 connected to the storage unit 5.

The storage unit 5 compresses image data transferred from the core unit 10 and stores the compressed image data in the hard disk 6 together with an ID for searching for the image data. Also, the storage unit 5 searches for compressed image data stored in the hard disk 6 based on code data transferred via the core unit 10, reads and expands the image data that has been found, and transfers the expanded image data to the core unit 10.

The computer interface unit 7 is an interface between a personal computer or a workstation (PC/WS) 11 and the core unit 10, and the interface with the PC/WS 11 may be a one-to-one local connection or a network-based connection.

The RIP unit 8 rasterizes code data (PDL) representing an image transferred from the PC/WS 11 into image data that can be recorded by the printer unit 2.

The operation unit 9 includes a touch-panel display and a hardkey, and it serves as a user interface that allows instructions to and operation settings for the image forming apparatus.

The core unit 10 controls flows of data among the reader unit 1, the printer unit 2, the facsimile unit 4, the storage unit 5, the computer interface unit 7, the RIP unit 8, and the operation unit 9. The core unit 10 will be described later in more detail.

The reader unit 1, the printer unit 2, and the image input/output control unit 3 may be integrally or separately configured, and all such variations are among the preferred embodiments of the present invention.

Figure 2:
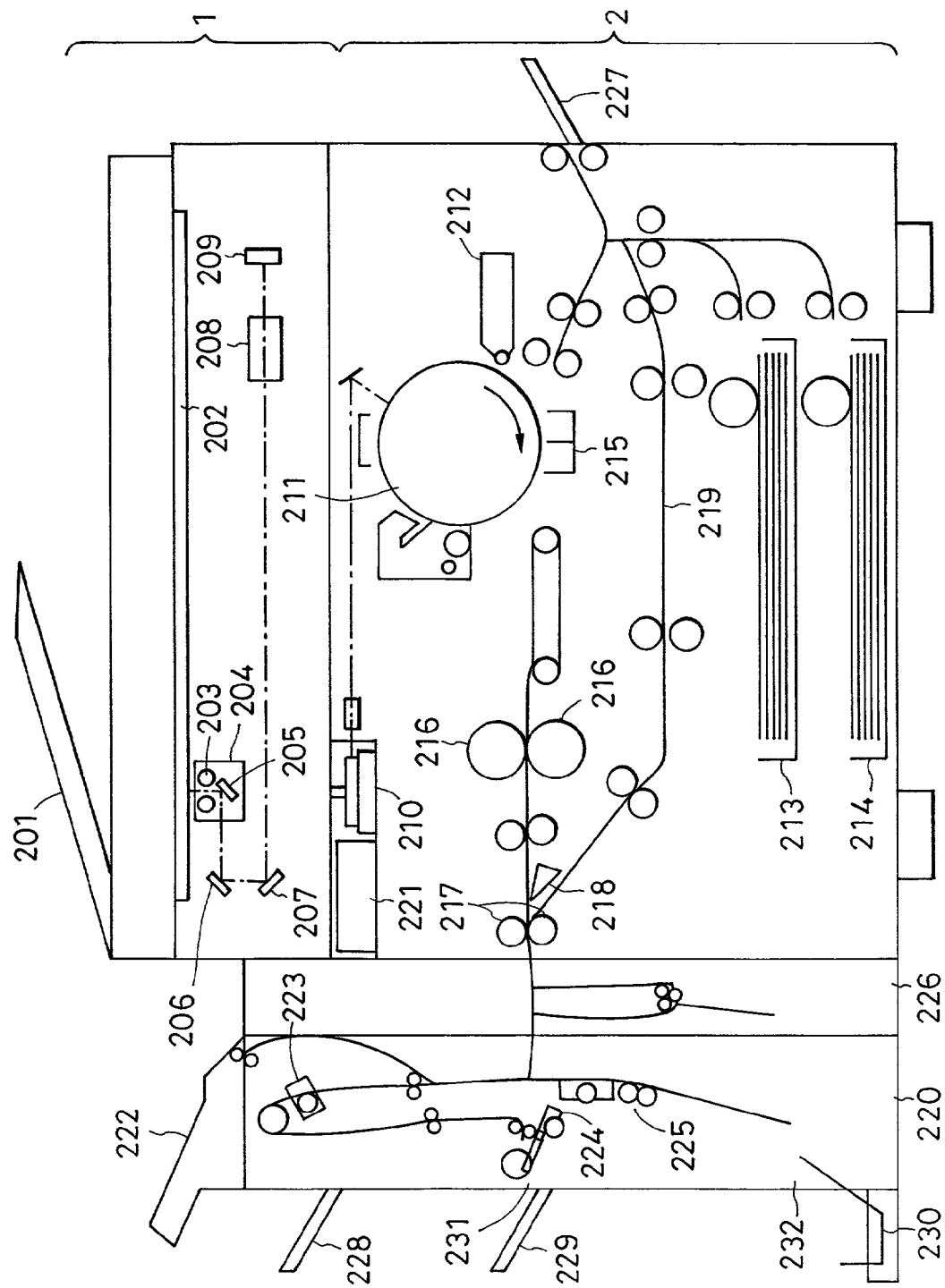
FIG. 2 is a sectional view of the reader unit and the printer unit shown in FIG. 1.

FIG. 2 is a sectional view of the reader unit 1 and the printer unit 2 shown in FIG. 1.

In the reader unit 1, an original document feeder 201 feeds an original document to a platen glass 202 sheet by sheet from the beginning, and upon completion of the reading of the original document, it ejects the original document that has been placed on the platen glass 202. When the original document is transported onto the platen glass 202, a lamp 203 is turned on, and a scanner unit 204 is then moved to scan across and expose the original document. The light returning from the original document is guided to a CCD image sensor (hereinafter referred to as CCD) 209 by mirrors 205, 206, and 207, and a lens 208. Thus, an image of the original document that has been scanned is read by the CCD 209. Image data output from the CCD 209 undergoes predetermined processing, and then transferred to the core unit 10 of the image input/output control unit 3.

In the printer unit 2, a laser driver 221 drives a laser beam emitting unit 210. More specifically, the laser driver 221 lets the laser beam emitting unit 210 emit a laser beam corresponding to the image data output from the core unit 10 of the image input/output control unit 3. The laser beam irradiates a photosensitive drum 211, whereby a latent image corresponding to the laser beam is formed on the photosensitive drum 211. On the portion of the latent image on the photosensitive drum 211, a developer is applied by a developing unit 212.

Then, at a timing synchronized with the beginning of the irradiation of the laser beam, a recording sheet is fed from a paper feed cassette 213 or 214 (more than two can, of course, be provided), or from a manual paper feed tray 227, and is transported to a transfer unit 215, where the developer applied to the photosensitive drum 211 is transferred to the recording sheet. The recording sheet with the developer transferred thereto is transported to a fixing unit 216, where the developer is fixed onto the recording sheet by heat and pressure. The recording sheet that has passed through the fixing unit 216 is ejected by an ejecting roller 217.

If double-face recording is specified, when the recording sheet has been transported to the ejecting roller 217, the ejecting roller is rotated in the reverse direction so that the recording sheet is guided to a re-feeding path 219 by a flapper 218. The recording sheet that has been guided to the re-feeding path 219 is fed to the transfer unit 215 at the timing described above.

If a Z-folding unit 226 is incorporated in the main unit, according to an instruction from the operation unit 9, the recording sheet is transported to the Z-folding unit 226 so that the recording sheet is Z-folded. If a finisher 220 is incorporated, recording sheets that have been ejected can be bundled and assorted, and the recording sheets can be punched by a puncher 223 or stapled by a stapler 224 according to an instruction from the operation unit 9.

A saddle stitcher 225 is used to stitch the center of recording sheets and to fold the recording sheets along the center so that the recording sheets are bound together. An inserter 222 allows recording sheets with pre-performed prints thereon to be fed as a book cover or insertion sheets, which allows the recording sheets to be transported without passing through the recording sheet path of the printer unit 2 and therefore without damage thereto.

When the saddle stitcher 225 is not used, the recording sheet is ejected to either a movable tray 228 or a movable tray 229 via a paper outlet 231. Each of the movable trays 228 and 229 can be moved upward and downward. When the output is directed to the movable tray 228, the movable tray 228 is moved down to the position of the paper outlet 231. Outputs for jobs in which the saddle stitcher 225 is used are ejected to a binding tray 230 via a paper outlet 232.

Figure 3:
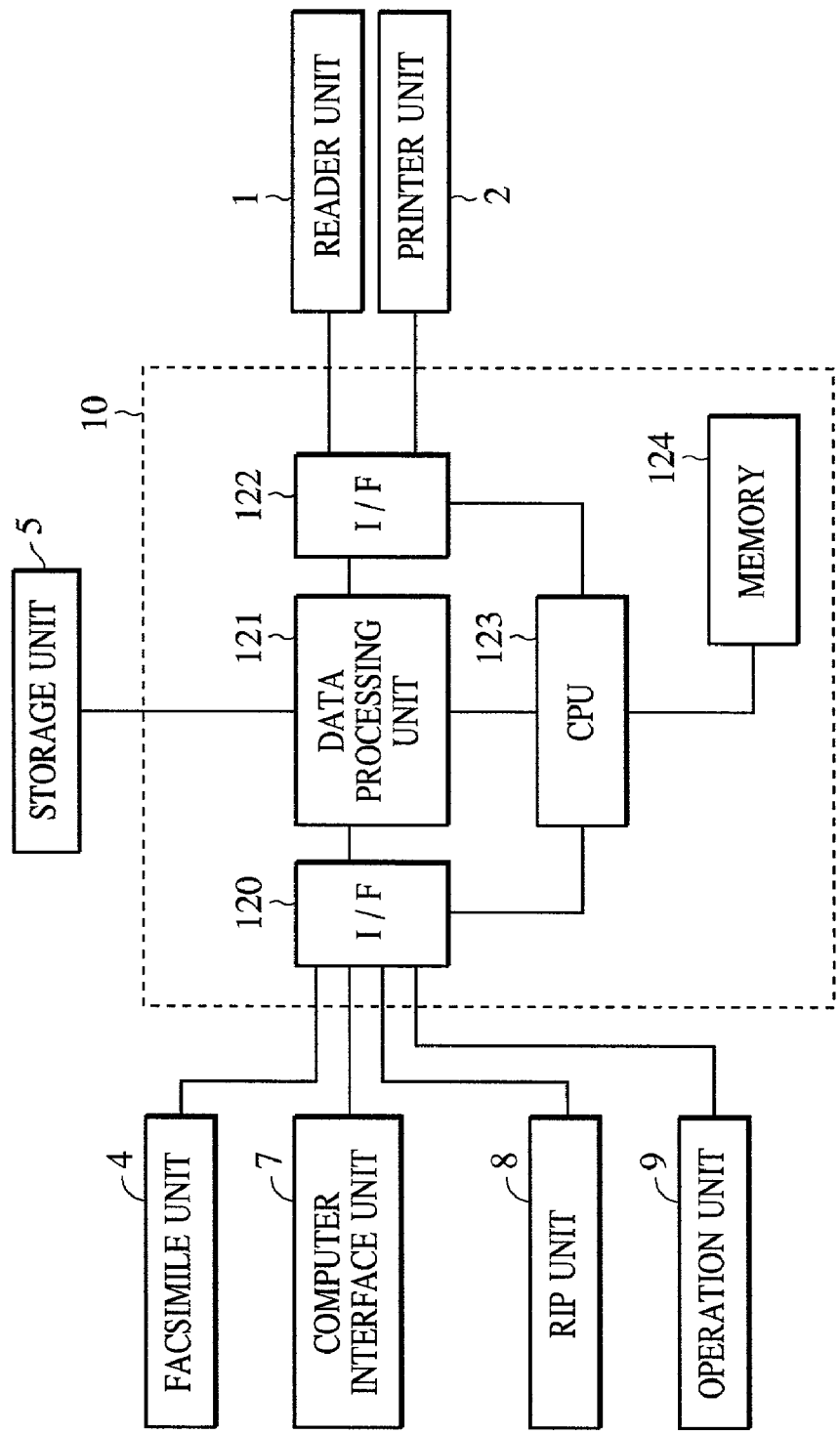
FIG. 3 is a block diagram showing the construction of the core unit shown in FIG. 1.

FIG. 3 is a block diagram showing the construction of the core unit 10 shown in FIG. 1.

Referring to FIG. 3, image data from the reader unit 1 is transferred to a data processing unit 121 via an interface 122.

The data processing unit 121 performs image processing such as rotation and variable magnification and also compresses and expands image data, and it includes a page memory storing a plurality of pages of image data. The image data that has been transferred from the reader unit 1 to the data processing unit 121 is temporarily stored in the page memory, and then compressed and transferred to the storage unit 5 via an interface 120.

Code data (PDL) representing an image, input via the computer interface unit 7, is transferred to the data processing unit 121 via the interface 120, and then transferred to the RIP unit 8 and rasterized into image data. The image data is transferred to the data processing unit 121 and then transferred to the storage unit 5.

Image data from the facsimile unit 4 is transferred to the data processing unit 121 and then transferred to the storage unit 5.

Image data from the storage unit 5 is transferred to the data processing unit 121 and then transferred to the printer unit 2, the facsimile unit 4, or the computer interface unit 7.

A CPU 123 performs various controls as described above and to be described later, according to control programs (including programs for executing the processes in flowcharts shown in FIGS. 6, 9, and 19, programs for controlling display on the operation unit 9, etc., to be described later) stored in a memory 124 and control commands transferred from the operation unit 9. The memory 124 is also used as a working area for the CPU 123.

As described above, processes in which functions such as reading of an image of an original document, printing of an image, transmission/reception of an image, storage of an image, and input/output of data from a computer are combined can be performed with the core unit 10 playing a central role and the storage unit 5 as an intermediary.

Figure 4:
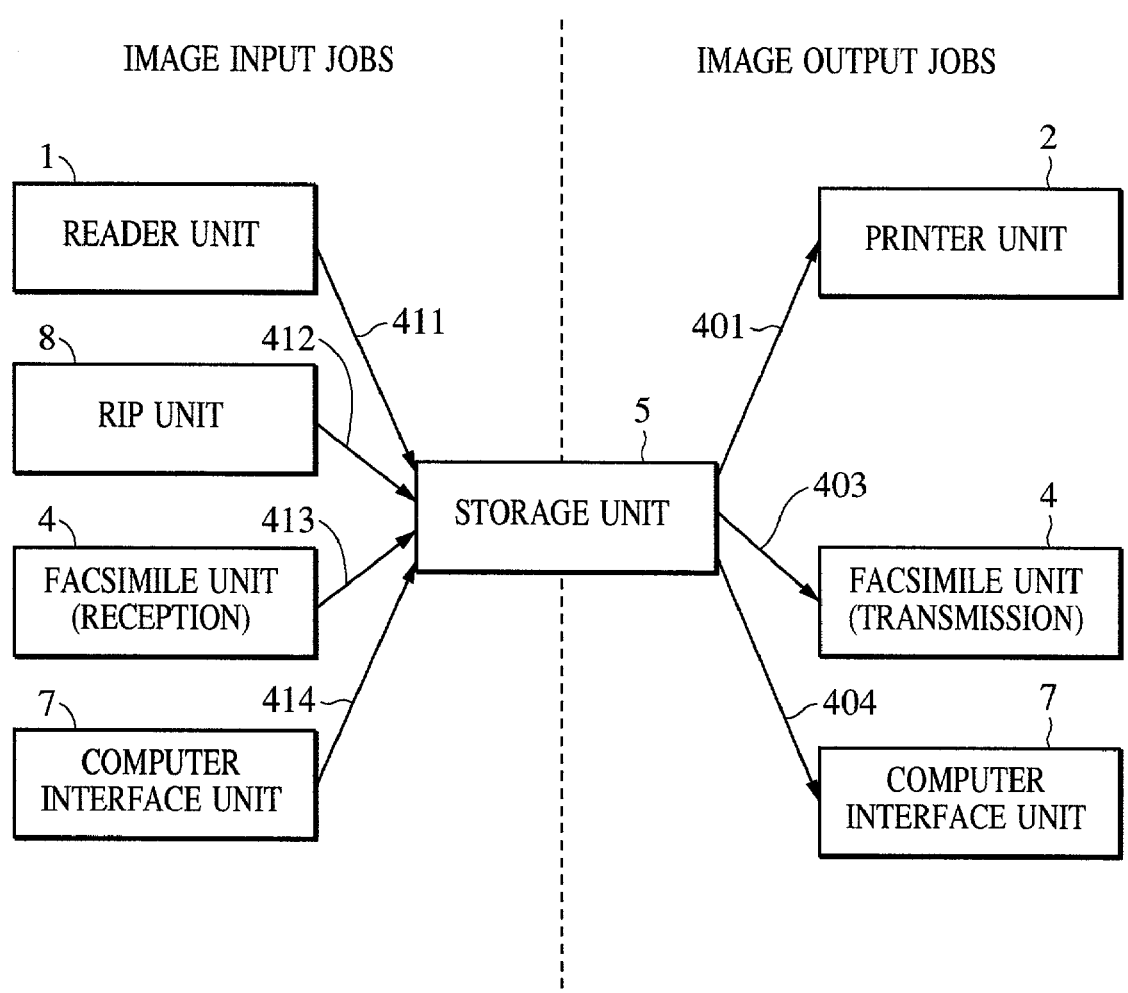
FIG. 4 is a diagram showing logical units of job control in the image forming apparatus according to the first embodiment.
Figure 5A:
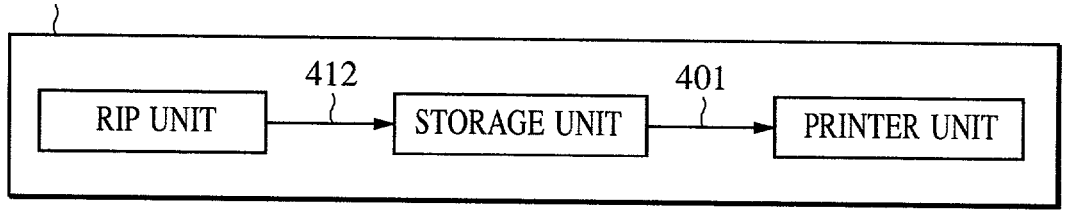
FIG. 5 consisting of FIGS. 5A to 5E shows examples of job units in which one or more jobs shown in FIG. 4 are included (hereinafter referred to as a "combined job").
Figure 5B:
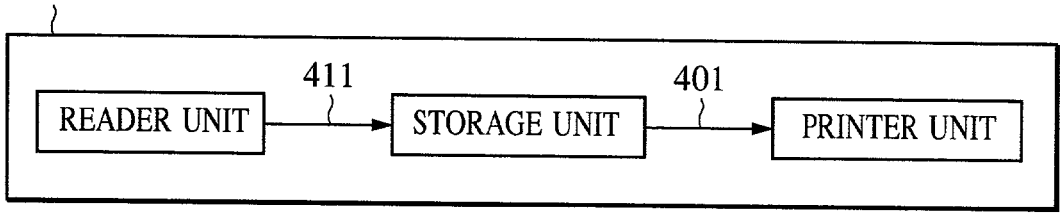
Figure 5C:
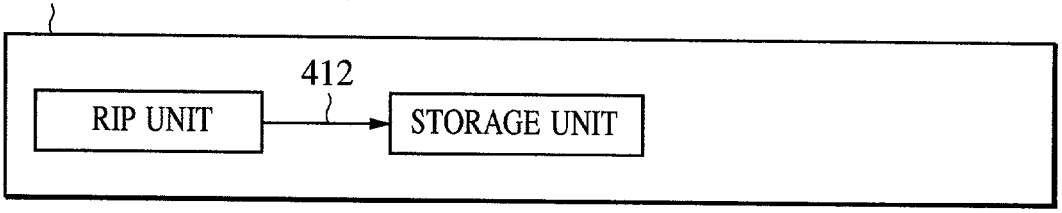
Figure 5D:
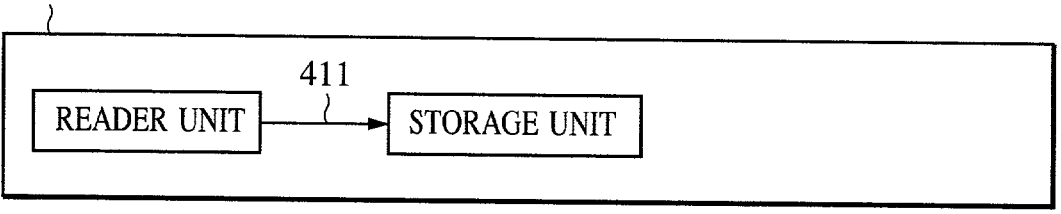
Figure 5E:
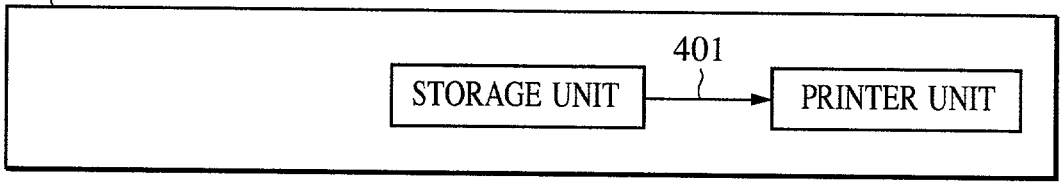

FIG. 4 shows logical units of job control by the CPU 123 in the image forming apparatus according to this embodiment. A unit of job control is an input or output process of a unit of image data including one or more pages. Thus, jobs to be controlled are largely classified into image input jobs and image output jobs.

The image input jobs include an image input job 411 for sequentially recording image data read by the reader unit 1 in the storage unit 5, an image input job 412 for sequentially recording image data rasterized in the RIP unit 8 in the storage unit 5, an image input job 413 for sequentially recording image data received by the facsimile unit 4 in the storage unit 5, image input job 414 for sequentially recording image data input from the computer interface unit 7 in the storage unit 5, and the like. These image input jobs are managed and classified by the CPU 123 so as to be distinguishable from each other.

The image output jobs include an image output job 401 for sequentially outputting image data read from the storage unit 5 to the printer unit 2, an image output job 403 for sequentially outputting image data read from the storage unit 5 to the facsimile unit 4, an image output job 404 for sequentially outputting image data read from the storage unit 5 to the computer interface unit 7, and the like. These image output jobs are managed and classified by the CPU 123 so as to be distinguishable from each other.

FIG. 5 shows examples of job unit that includes one or more jobs among the image input jobs 411 to 414 and image output jobs 401 to 404 shown in FIG. 4 (hereinafter referred to as a "combined job").

Referring to FIG. 5, a PDL print job 501 includes the image input job 412 and the image output job 401 as a combined job to be controlled by the CPU 123. The PDL print job 501 is handled as a job in print mode. A copying job 502 includes the image input job 411 and the image output job 401 as a combined job to be controlled by the CPU 123. The copying job 502 is handled as a job in copying mode.

A PDL recording job 503 includes only the image input job 412 as a combined job to be controlled by the CPU 123. The PDL recording job 501 is handled as a job in print mode. A scan job 504 includes only the image input job 411 as a combined job to be controlled by the CPU 123. The scan job 504 is handled as a job in scan mode. A print job 505 includes only the image output job 401 as a combined job to be controlled by the CPU 123. The print job 505 is handled as a job of a box function to be described later.

A combined job is a control unit that includes one or more jobs. For example, the image input job 412, the image output job 401, and the image output job 403 may be combined as handled as a single combined job under the control of the CPU 123.

Now, as an example of combined job control and job control in the image forming apparatus according to this embodiment, a procedure for controlling the PDL print job 501 constituted of the image input job 412 for sequentially recording image data rasterized in the RIP unit 8 in the storage unit 5 and the image output job 401 for sequentially printing the image data in the storage unit 5 by the printer unit 2 will be described with reference to FIGS. 6 to 10.

Figure 6:
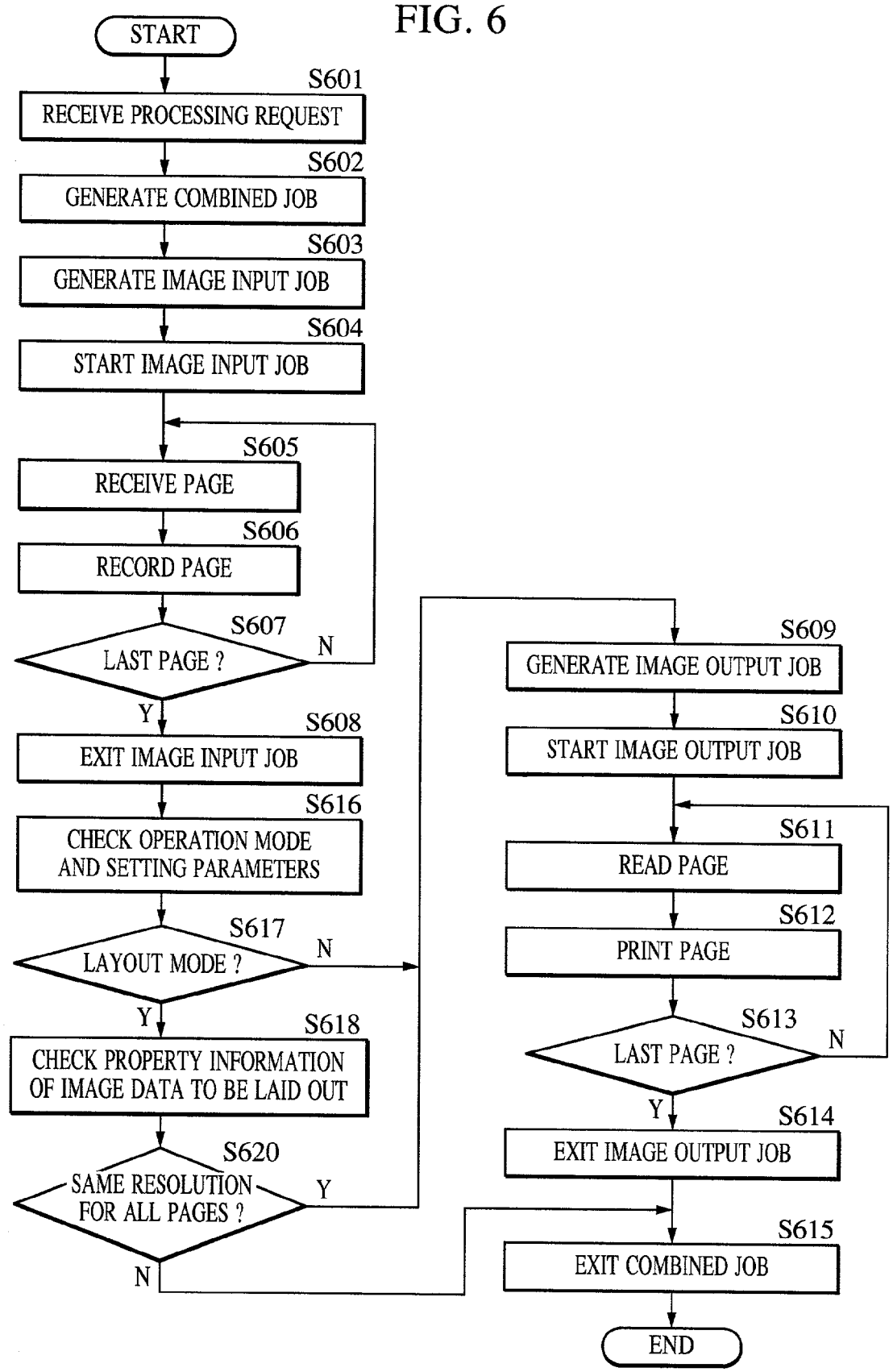
FIG. 6 is a flowchart showing an example of a first control process procedure in an image forming apparatus according to the present invention.

FIG. 6 is a flowchart showing an example of a first control process procedure in an image forming apparatus according to the present invention. More specifically, the flowchart shows, as an example of combined job control and job control in an image forming apparatus according to the present invention, a procedure for controlling the PDL print job 501 constituted of the image input job 412 for sequentially recording image data rasterized in the RIP unit 8 in the storage unit 5 and the image output job 401 for sequentially printing the image data in the storage unit 5 by the printer unit 2. Steps of the procedure are indicated as S601 to S615 and S620 in FIG. 6. The processes shown in FIG. 6 are executed by the CPU 123 shown in FIG. 3 according to programs read from the memory 124.

FIG. 7 is a diagram showing an example of combined job management table in the image forming apparatus according to this embodiment. The CPU 123 stores the table, for example, in the memory 124, and manages and uses information in the table.

In step S601 in FIG. 6, a user specifies print settings via a user interface of the PC/WS 11. The print settings include, for example, the number of copies, the size of sheet, enlargement/reduction ratio, single face/double face, output order of pages, sorted output, whether or not to staple, layout mode, etc. (Layout modes include enlargement mode, a reduction mode, i.e., Nin1 modes such as 2in1 mode and 4in1 mode in which a plurality of images are arranged and formed on the same face of a recording sheet, Nin1 double-face mode, binding mode, pamphlet mode, etc.) Let it be assumed herein that the user has set the binding mode as layout mode in the print settings. After the print settings have been made, the user issues a print instruction via the user interface of the PC/WS 11. Then, driver software installed on the PC/WS 11 converts document data associated with the print instruction into what is called PDL data, and transfers the PDL data to the computer interface unit 7 of the image forming apparatus via a computer interface connected to the PC/WS 11, together with print setting parameters in accordance with the print settings that have been made by the user via the user interface and property information of the image data (resolution, the number of pixels, the number of colors, size, etc.). The PDL data representing the image input via the computer interface unit 7 is transferred to the data processing unit 121, and then transferred to the RIP unit 8, where the PDL data that has been transferred is sequentially rasterized into image data. Upon starting reception of the PDL data, the RIP unit 8 issues a processing request to the core unit 10. In the core unit 10, the CPU 123 receives the processing request. Information relating to print settings made by the user and the property information of the image data are also transferred to the CPU 123.

In step S602 in FIG. 6, in response to the processing request issued by the RIP unit 8, a combined job is internally generated and managed.

FIG. 7 shows a combined job management table 700. When a combined job is generated, the combined job management table 700 is created on the memory 124 under the control of the CPU 123, and the combined management table holds various information relating to the combined job until completion thereof. A combined job ID field 701 stores a combined job ID that is uniquely generated for the combined job in the image forming apparatus.

A combined job type field 702 identifies the type of the combined job (PDL print job, copying job, PDL recording job, scan job, print job using the box function, etc.), and in this example, the combined job field 702 indicates a PDL print job. A combined job priority field 703 stores a priority level regarding the order of processing the combined job.

A combined job status field 704 stores the execution status of the combined job (ready for execution, execution in progress, suspended, completed, error, etc.) according to the execution status of the image forming apparatus (job processing status, status information, error information from sensors, etc.). A number-of-link-jobs field 705 stores the number of image input jobs and image output jobs constituting the combined job, and in this example, the number of link jobs is two, which corresponds to the image input job 412 and the image output job 401. A first job pointer field 706 is a pointer to a job management table 710 for the image input job 412. A second job pointer field 707 is a pointer to a job management table 730 for the image output job 401.

In step S603 in FIG. 6, the job management table 710 for the image input job 412 is created in the memory 124, and the job management table 710 holds various information relating to the image input job 412 until completion thereof.

Referring to FIG. 7, a job ID field 711 stores a job ID that is uniquely generated for the image input job 412 in the image forming apparatus. A job type field 712 identifies the type of the job (one of the image input jobs and the image output jobs described earlier), and in this example, the job type field 712 indicates the image input job 412 for sequentially recording the image data rasterized in the RIP unit 8 in the storage unit 5.

A job priority field 713 stores a priority level regarding the order of processing the job. A job status field 714 stores the execution status of the job (ready for execution, execution in progress, suspended, completed, error, etc.) according to the execution status of the image forming apparatus (job processing status, status information, error information from sensors, etc.). A number-of-pages field 715 stores the number of pages of the job. A page pointer field 716 is a pointer to a page management table 720 storing detail information of each page managed under the job. The page management table 720 is stored on the hard disk 6.

A job parameters field 717 stores various setting parameters for the job, and in this embodiment, the job parameters field 717 stores the number of copies, the size of sheet, enlargement/reduction ratio, single face/double face, output order of pages, sorted output, whether or not to staple, layout mode if any, etc. (Again, layout modes include enlargement mode, a reduction mode, i.e., Nin1 modes such as 2in1 mode and 4in1 mode in which a plurality of images are arranged and formed on the same face of a recording sheet, Nin1 double-face mode, binding mode, pamphlet mode, etc.) The setting parameters are based on the settings based on the user instructions input via the user interface.

In step S604 in FIG. 6, processing of the image input job 412 that has been generated is started. In step S605, one page of the image data rasterized in the RIP unit 8 is received. That is, the image data is transferred from the RIP unit 8 to the data processing unit 121 via the interface 120.

In step S606, the image data transferred to the data processing unit 121 is recorded on the hard disk 6 in the storage unit 5. At this time, various property information (resolution, the number of pixels, etc.) is recorded in a page 1 field 721 of the page management table 720 and a page 1 field 741 of a page management table 740. The property information is recorded in association with corresponding image data, and the property information is based on the settings made by the user and the result of analysis of properties of the image data by a processing unit (not shown) in the image forming apparatus.

In step S607, it is determined whether all the pages to be processed, rasterized in the RIP unit 8, have been recorded on the hard disk 6 in the form of image data. If it is found that any page yet to be processed remains, the procedure returns to step S605. If it is found that all the pages have been processed, the number of pages of the job is stored in the number-of-pages field 715, and the procedure proceeds to step S608.

In step S608, the job status filed 714 in the job management table 710 generated in step S603 is set to indicate completion, and then the procedure proceeds to step S616.

In step S616, the operation mode and the setting parameters for the job are checked with reference to the settings made by the user in step S601 and the setting parameters set in the job parameters field 717 in the job management table 710 shown in FIG. 7. Then, in step S617, it is determined whether the job includes an instruction for execution in layout mode.

If it is determined in step S617 that the job includes an instruction for execution in layout mode, the property information of one or more image data to be laid out and printed among the image data recorded in the hard disk 6 by the end of step S608 is checked in step S618, and the procedure proceeds to step S620.

In step S620, the page management table 720 is checked to determine whether the resolutions, included in the image property information, of all the pages of the one or more image data to be laid out and printed among the image data recorded on the hard disk 6 by the end of step S608 are the same. If it is determined in step S620 that the resolutions of all the pages are the same, the procedure proceeds to step S609.

On the other hand, if it is determined in step S620 that the resolutions are not the same for all the pages, the procedure proceeds to step S615. Alternatively, if the resolutions are not the same, an error message may be displayed on the operation unit 9. For example, a message saying "layout and print processes are cancelled due to disparity in the property (resolution) of the image data to be laid out" is reported to the user at the source of the image data. (For example, the message is reported to the operation unit 9 when in copy mode, whereas when in print mode from a PC, the message is reported to the PC at the source of the data and displayed on the user interface of the PC.) Then, the procedure is exited in step S615, and waits for an instruction from the user.

In step S609, the job management table 730 for the image output job 401 is created on the memory 124, and the job management table 730 holds various information relating to the image output job 401 until completion thereof.

Referring to FIG. 7, a job ID field 731 stores a job ID that is uniquely generated for the image output job 401 in the image forming apparatus. A job type field 732 identifies the type of the job (one of the image input jobs and image output jobs described earlier), and in this example, the job type field 732 indicates the image output job 401 for sequentially printing image data in the storage unit 5 by the printer unit 2.

A job priority field 733 stores a priority level regarding the order of processing the job. A job status field 734 stores the execution status (ready for execution, execution in progress, suspended, completed, error, etc.) according to the execution status of the image forming apparatus. A number-of-pages field 735 stores the number of pages of the job. A page pointer field 736 is a pointer to a page management table 740 storing detail information of each page managed under the job.

The page management table 740 is actually the same table as the page management table 720 for the page image input job 412, recorded on the hard disk 6. A job parameters field 737 stores various setting parameters for the job, and in this embodiment, the job parameters field 737 stores the number of copies, the size of sheet, enlargement/reduction ratio, single face/double face, output order of pages, sorted output, whether or not to staple, layout mode if any (layout modes include enlargement mode, a reduction mode, i.e., Nin1 modes such as 2in1 mode and 4in1 mode in which a plurality of images are arranged and formed on the same face of a recording sheet, Nin1 double-face mode, binding mode, pamphlet mode, etc.), and document management information including document name and date and time of recording.

In step S610 in FIG. 6, processing of the image output job 401 that has been generated is started. In step S611, pages of image data recorded on the hard disk 6 of the storage unit 5 are sequentially read and transferred to the data processing unit 121 via the interface 120.

In step S612, image data is read according to an image processing table shown in FIG. 10 and to be described later. Then, with reference to various image property information (resolution, the number of pixels, etc.) stored in the corresponding page fields 741 to 74p, the image data is rotated as required in the data processing unit 121. Furthermore, based on the setting parameters in the job parameters field 737 and the settings made by the user, for example, if an instruction for execution in layout mode is included in the job to be processed, a layout process (determining the magnification factor, layout position, the order of reading images, etc., so that a plurality of images are formed in appropriate sizes at appropriate positions of sheets, and processing the images accordingly) is performed in an image layout memory (not shown) in the data processing unit 121 according to the instruction. Then, the image data that has been laid out on the image layout memory is read from the image layout memory and transferred to the printer unit 2 via the interface 122 so that the printer unit 2 forms images as described earlier and prints the images.

The job for which the layout process is performed and printing is permitted is a job for which the determination in step S620 has turned out positive. As for a job for which the determination in step S620 has turned out negative, image data that has been laid out is inhibited from being printed, not allowing the printer unit 2 to print images.

As for a job that has been determined in step S617 as not including an instruction for execution in layout mode, the processes in steps S618 and S620 are skipped, and the procedure directly proceeds from step S617 to step S609. Then, in step S612, based on the settings made by the user, the images of the job are printed are printed by the printer unit 2 in a mode other than layout mode, for example, in normal print mode (single-face print mode, variable magnification mode in which variable magnification is performed on an image, etc.). As described above, processes in steps S618 and S620, required in a job that includes an instruction for execution in layout mode, are skipped for a job that does not include an instruction for execution in layout mode, so that unnecessary processes are saved, serving to improve productivity.

In step S613, it is determined whether all the pages of the image data recorded on the hard disk 6 have been printed. For example, if 32 pages are to be printed in 4in1 layout mode (a mode in which four pages of image are arranged and formed on the same face of a sheet), eight recording sheets on each of which four pages of image are formed are to be output. Thus, it is checked whether printing for eight recording sheets has been completed. If it is found in step S613 that any page to be processed remains, the procedure returns to step S611, whereas if it is found that all the pages have been processed, the procedure proceeds to step S614.

In step S614, the job status field 734 in the job management table 730 is set to indicate completion, and the procedure proceeds to step S615.

In step S615, the job management tables 710 and 730 created in steps S603 and S609, the page management table 720 generated in step S606, and image data of each of the pages are deleted to deallocate resources, and the combined job management table 700 created in step S602 is also deleted to deallocate resources, and the series of processes is exited.

Step S620 may alternatively be such that it is checked that the number of pixels (included in the image property information) is the same for all the pages to be laid out, the procedure proceeding to step S609 if the check turns out positive and proceeding to step S615 if the check turns out negative.

Furthermore, the property information may include information regarding color such as distinction between color image and black and white image, information regarding type of image such as size of image, etc. Accordingly, for example, the printer unit 2 is permitted to execute in Nin1 mode if the pages of image to be laid out and printed are either all color images or all black and white images; whereas the printer unit 2 is inhibited from executing in Nin1 mode if the pages include both color images and black and white images. Similarly, if the pages of image to be laid out and printed are different in size (e.g., A4 and A3), layout of the pages is inhibited, whereas if the pages are the same in size, printing in Nin1 mode is permitted. Furthermore, the CPU 123 may check the property information of image data based on instructions from a user input in association with image data to be printed when print settings are made, or based on the result of an analysis of properties of image data by an analysis unit.

As described above, according to this embodiment, whether or not to permit layout of a plurality of images to be arranged on a sheet is determined based on the image property information of the plurality of images (resolution, the number of pixels, color property as to distinction between color and black and white, image size, etc.), permitting execution of layout so that the printer unit 2 executes a print with a layout if the image property is the same for all of the images, while inhibiting execution of layout so that the printer unit 2 is inhibited from executing a print with a layout if the image property is not the same for all of the pages (recording of images on a recording sheet by the printer unit 2 is inhibited and a message to that effect is reported).

If the image property information is not the same for all of a plurality of image data included in a job for which layout mode is specified, the layout mode setting may be cancelled so that layout will not be performed, and the plurality of image data that have been planned to be laid out may be printed by the printer unit 2 not on the same recording sheet but separately on different recording sheets in a different mode, for example, normal print mode (single-face print mode). Furthermore, the arrangement may be such that the user is allowed to select whether to inhibit printing by the printer unit 2 or to switch from layout mode to a different mode and to execute a print in that mode by the printer unit 2. In that case, when the user is notified that layout has been cancelled, the user is queried as to the selection, and one of the operations is selected according to the reply to the query. If the user selects to switch from layout mode to a different mode and to print by the printer unit 2, the user may be requested to select a particular mode other than layout mode so that the printer unit 2 executes a print according to a reply from the user.

Layout modes include, for example, double-face mode in which images are formed on both faces of a sheet, Nin1 mode in which a plurality of images are formed on the same face of a sheet, Nin1 double-face mode in which a plurality of images are formed on each of the faces of a sheet, etc.

If the binding mode is specified in step S601 in FIG. 6 described earlier, the processes described below are executed.

Figure 8A:
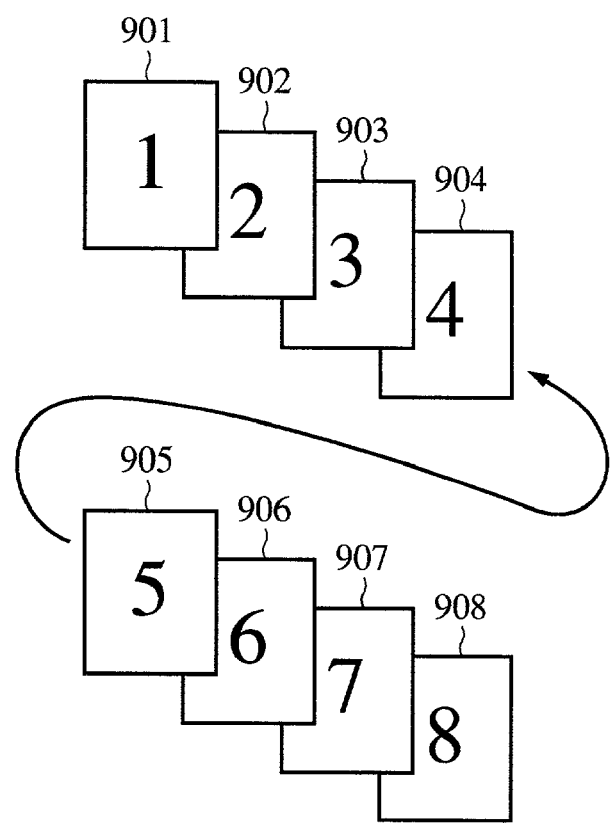
FIGS. 8A to 8C are diagrams showing an example of binding layout in an image forming apparatus according to the present invention.
Figure 8B:
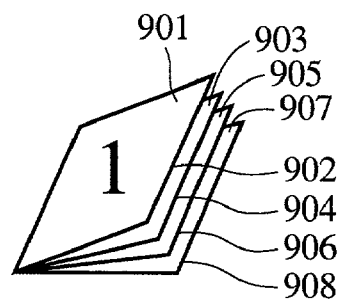
Figure 8C:
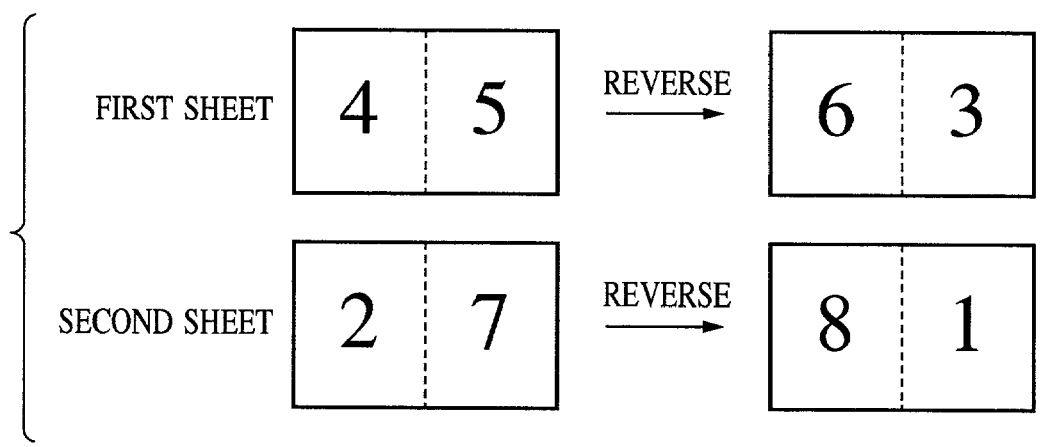

FIGS. 8A to 8C are schematic diagrams showing an example of binding layout in the image forming apparatus according to this embodiment.

FIG. 8A shows input original documents 901 to 908, which are sequentially recorded on the hard disk 6 in step S606 in FIG. 6.

FIG. 8B shows the sheets 901 to 908 as having been bound with double-face output, and FIG. 8C shows page allocations to the first sheet and the second sheet.

The number of output sheets P is calculated from the number of pages N of the original document of the job, stored in the number-of-pages field 715 or 735 shown in FIG. 7, according to the following formula:

$$P=QUOT[(N+3)/4]$$

where QUOT[X] denotes an integer quotient of X, i.e., an integer value obtained by truncating the fractional part of a quotient.

When the number of output sheets P has been calculated, the order of reading the images is determined and an image processing table indicating the order of reading the images is created.

Figures 9, 10:
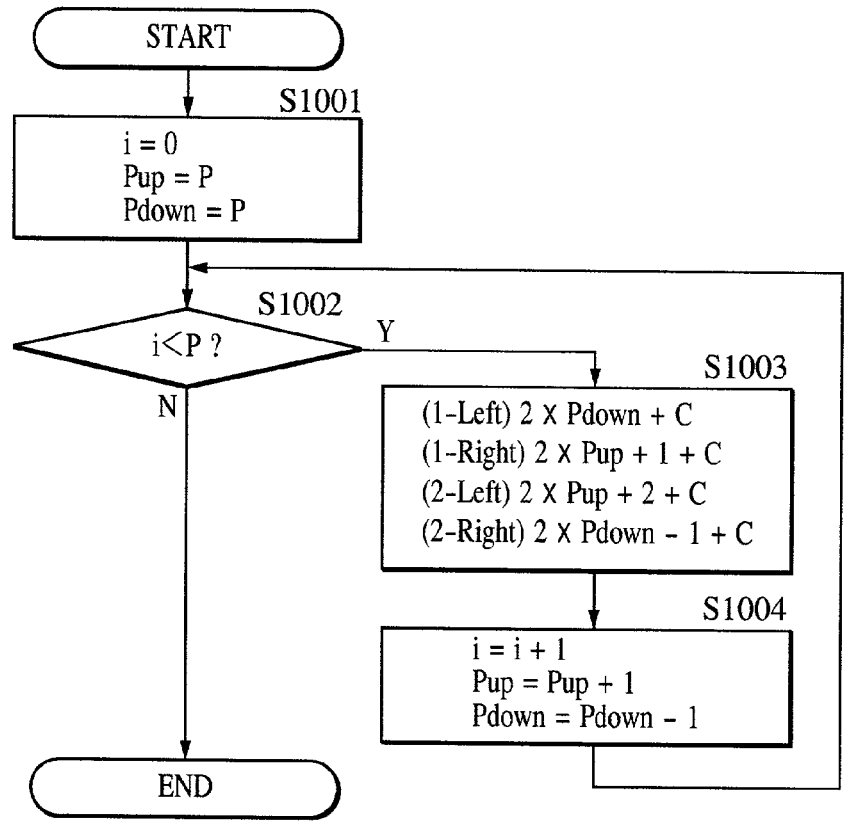
FIG. 9 is a flowchart showing an example of a second processing procedure in an image forming apparatus according to the present invention.
FIG. 10 is a diagram showing an image processing table in an image forming apparatus according to the present invention.

FIG. 9 is a flowchart showing an example of a second processing procedure in an image forming apparatus according to the present invention, that is, a processing procedure for creating the image processing table. In FIG. 9, steps are denoted by S1001 to S1004. The processes shown in the flowchart shown in FIG. 9 are executed by the CPU 123 shown in FIG. 3 according to programs stored in the memory 124.

First, in step S1001, a counter i is set to 0, and the number of output sheets P is set in a counter Pup and a counter Pdown.

In step S1002, the number of output sheets P and the counter i are compared. If it is determined that the comparison operation i<P evaluates to true, the procedure proceeds to step S1003, whereas if the comparison evaluates to false, the procedure is exited.

In step S1003, calculations are performed according to the following formulas:

(First on Left): 2×Pdown+C (First on Right): 2×Pup+1+C (Second Left): 2×Pup+2+C (Second on Right): 2×Pdown−1+C where C is the number of sheets of original document to be copied for a cover, if any. The results of the calculations are sequentially written to the image processing table shown in FIG. 10 and to be described later, which indicates the order of reading the images.

Then, in step S1004, the counter i is incremented by 1, the counter Pup is incremented by 1, and the counter Pdown is decremented by 1. The procedure then returns to step S1002, and the processes subsequent to step S1002 are repeated until "i<P" is no longer satisfied, whereby the image processing table shown in FIG. 10 is created.

FIG. 10 is a diagram showing the image processing table in the image forming apparatus according to this embodiment. The image processing table is stored in the memory 124 and managed by the CPU 123.

In the example shown in FIG. 10, first, the fourth image is laid out on the left side of an image layout memory. Then, the fifth image is laid out on the right side of the image memory. Then, the image in the image layout memory is printed on the first face of a sheet. Then, the next images, i.e., the sixth image and the third image, are similarly laid out in the image layout memory and then printed on the reverse face of the sheet.

Although the description has been made in the context of a case where image information is transferred from the PC/WS 11 in the form of PDL data and the PDL data is rasterized into image data and printed by the image forming apparatus according to print settings made on the PC/WS 11, the copying job 502 for outputting image information read by the reader unit 1 can also be executed in a similar manner.

Furthermore, the PDL recording job 503 and the scan job 504 can be similarly executed, with the control steps S604, S606, and S608 relating to an image output job omitted from the flowchart shown in FIG. 6.

Furthermore, the print job 505 can also be similarly executed, with the control steps S603, S605, and S607 relating to an image input job omitted from the flowchart shown in FIG. 6.

Second Embodiment

An image forming apparatus according to a second embodiment of the present invention will now be described.

Figure 11:
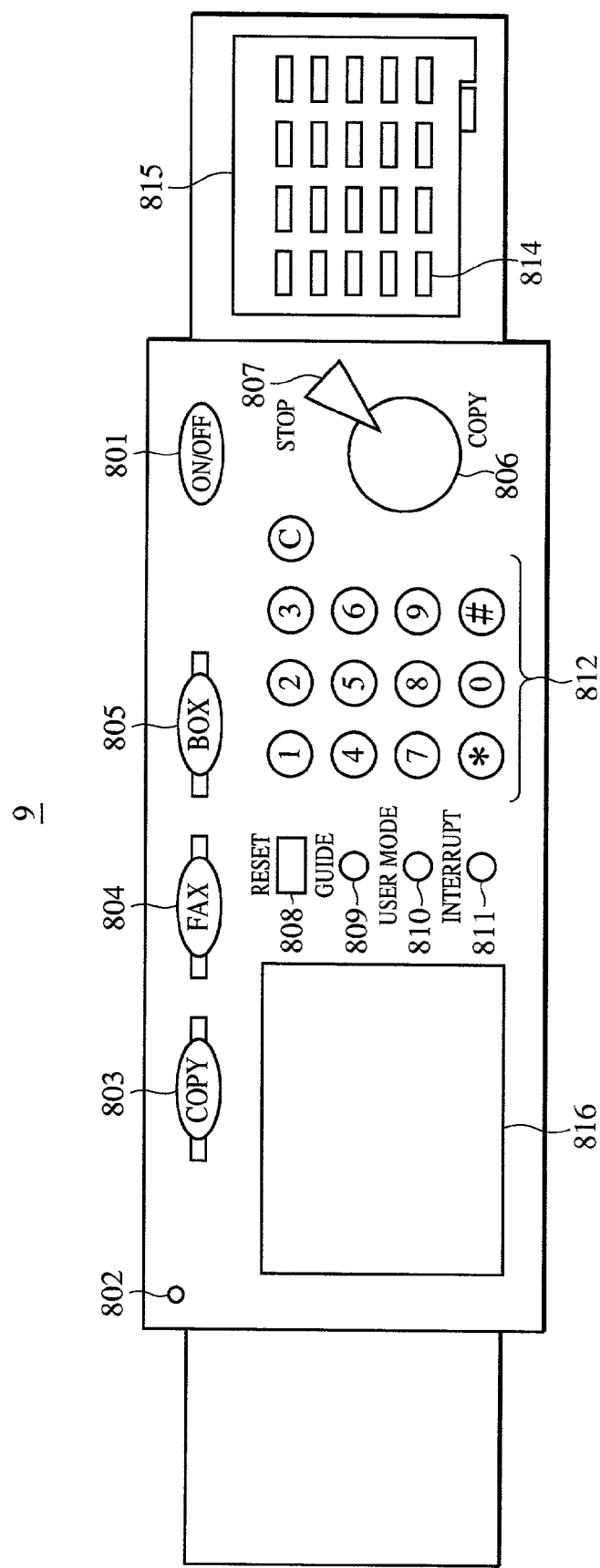
FIG. 11 is a plan view showing an overview of an operation unit shown in FIG. 1.

FIG. 11 is a plan view showing an overview of the operation unit 9 shown in FIG. 1.

Referring to FIG. 11, a power key 801 is depressed when turning the power supply on and off. A preheat key 802 is depressed when entering or exiting standby mode. A copying function selection key 803 is depressed when selecting copying function. A facsimile function selection key 804 is depressed when selecting facsimile function.

A box function selection key 805 is depressed when selecting box function. A start key 806 is depressed when starting various processes. A stop key 807 is depressed when halting various processes.

The box function is works as follows. A plurality of storage areas (boxes) is provided for each user in the hard disk 6 of the storage unit 5 included in the image forming apparatus, so that image data from the PC/WS 11, image data read by a scanner, etc., is stored in a box specified by a user at the source of the image data, in association with setting parameters (the number of prints, operation mode, etc.) based on print settings made by the user for the image data. Then, image data is read from a desired box specified by an instruction from the operation unit 9, processed in accordance with the settings from the operation unit 9, and output, for example, printed by the printer unit 2.

A reset key 808 is depressed when resetting various settings. An operation guidance key 809 is depressed when displaying guidance for operation. A user mode setting key 810 is depressed when setting user mode. An interrupt copying key 811 is depressed when performing an interrupt copying.

A numeric keypad 812 is used when inputting numerals such as the number of copies. A clear key 813 is depressed when clearing numerals input by the numeric keypad 812. Facsimile one-touch keys 814 are used when calling registered facsimile numbers. A switching cover 815 is opened and closed to switch facsimile numbers associated with the one-touch keys 814. A touch panel 816 displays various information, and various inputs can be made by touching various keys displayed thereon.

FIGS. 12 to 18 are schematic diagrams showing examples screens on the touch panel 816 of the operation unit 9 shown in FIG. 11.

Figure 12:
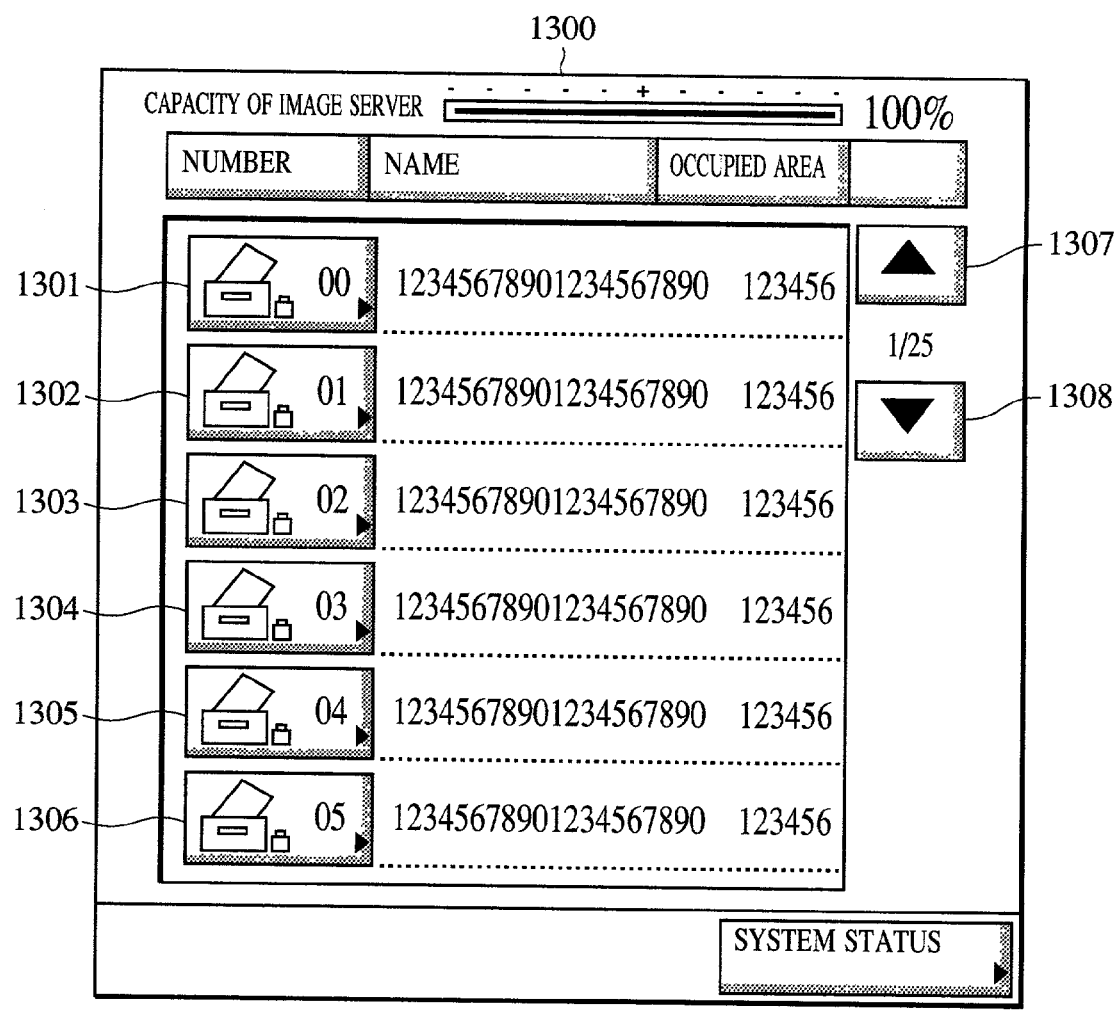
FIG. 12 is a schematic diagram showing an example screen of a touch panel in the operation unit shown in FIG. 11.

Referring to FIG. 12, a box list screen 1300 is displayed when the user depresses the box function selection key 805 in the operation unit 9 shown in FIG. 11. In the hard disk 6, a plurality of boxes can be stored with box names for the respective boxes. In the example shown in FIG. 12, 25 boxes are registered in the hard disk 6, and boxes 00 through 05 are shown on the screen.

Figure 13:
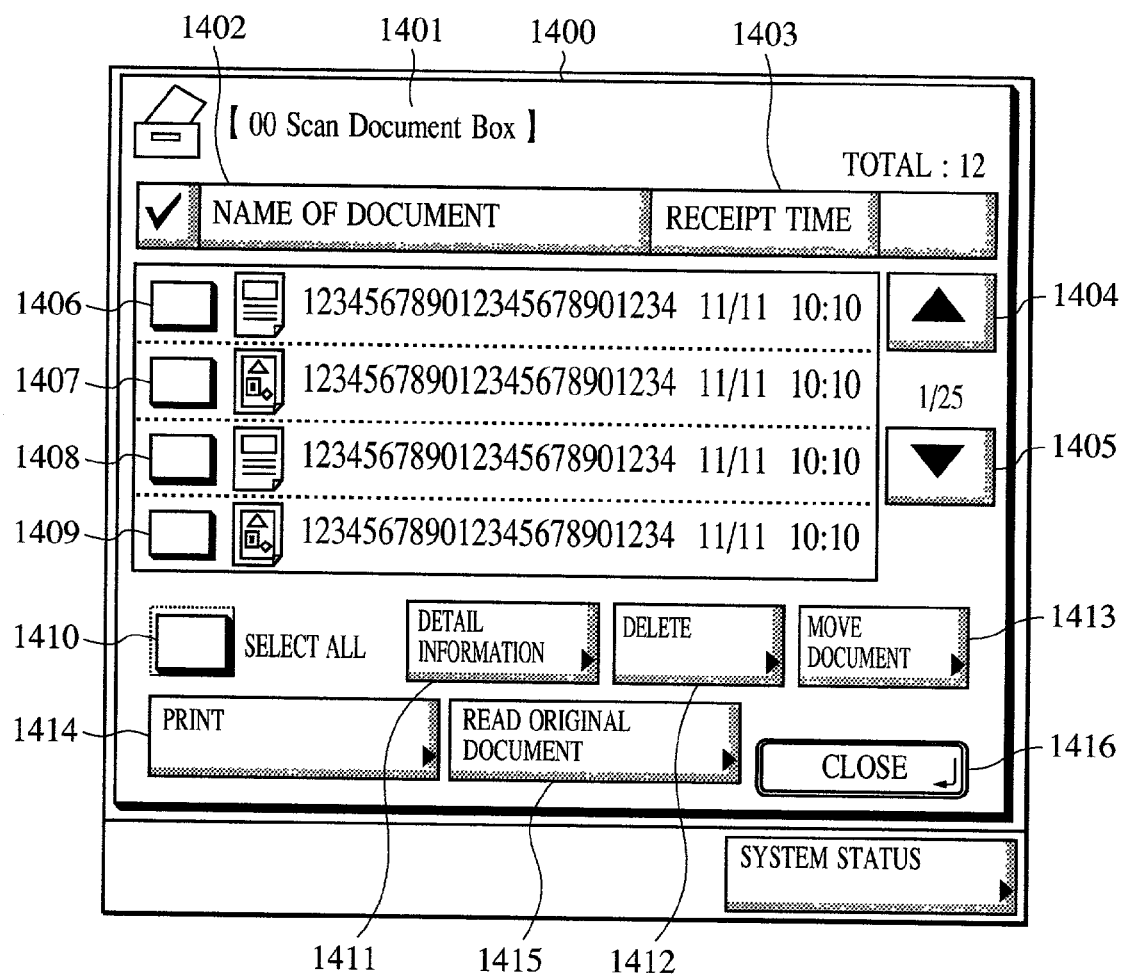
FIG. 13 is a schematic diagram showing an example screen of a touch panel in the operation unit shown in FIG. 11.

When a selection key 1301 for the box 00, a selection key 1302 for the box 01, a selection key 1303 for the box 02, a selection key 1304 for the box 03, a selection key 1305 for the box 04, or a selection key 1306 for the box 05 is touched by a user, a document list screen 1400 for the corresponding box is opened, as shown in FIG. 13.

A scroll-up key 1307 and a scroll-down key 1308 allow scrolling up and down so that selection keys not shown on the screen, associated with boxes 06 to 24, will be displayed.

Referring to FIG. 13, the document list screen 1400 is displayed when one of the selection keys 1301 to 1306 associated with the boxes 00 to 05 is touched. The document list screen 1400 is used to display information regarding a selected box and to select documents in the box. When a box selection key in the box list screen 1300 shown in FIG. 12 is touched, a document list screen 1400 corresponding to the key is displayed. Each box allows a plurality of documents to be stored therein. In the example shown in FIG. 13, the box 00 named "scan document box" is selected, in which 25 documents are stored.

Figure 14:
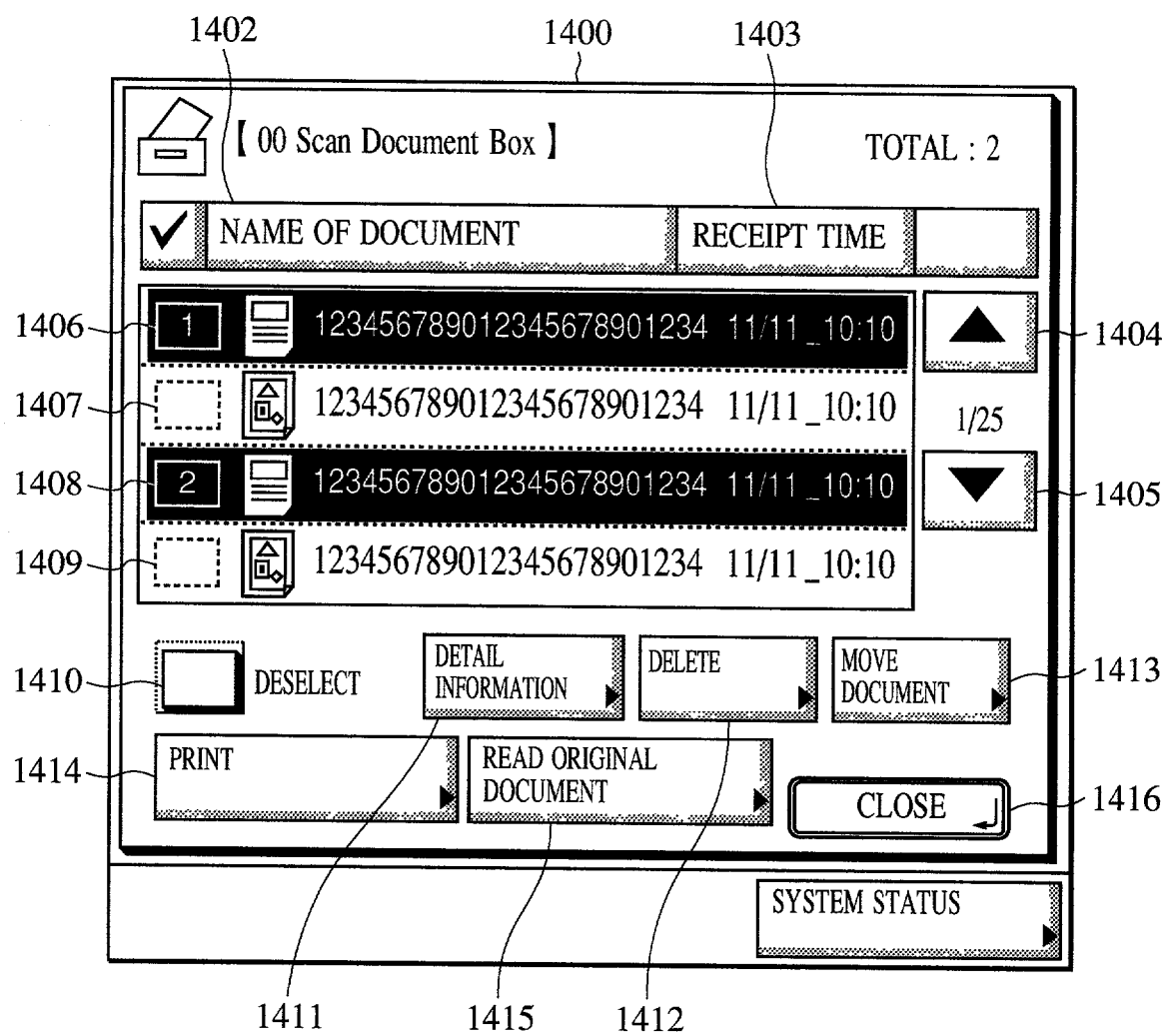
FIG. 14 is a schematic diagram showing an example screen of a touch panel in the operation unit shown in FIG. 11.

In the document list screen 1400, a box name display field 1401 displays a box number and a box name. A document name display field 1402 displays the name of each document stored in the box. A receipt time display field 1403 displays the date and time when each document in the box is stored. A scroll-up key 1404 and a scroll-down key 1405 are used to display documents stored in the box but not shown on the screen. Document selection buttons 1406, 1407, 1408, and 1409 are used to select documents from the box. When the user operates on the buttons 1406 to 1409 to select documents, a screen as shown in FIG. 14 is displayed. In this embodiment, either a single document or a plurality of documents can be selected for output using the buttons 1406 to 1409. Furthermore, all the documents stored in the box can be selected using a select-all-documents button 1410. An example of the result of document selection is shown in FIG. 14, in which the document selection keys 1406 and 1408 are touched so that the corresponding two documents are selected.

The select-all-documents button 1410 is touched when selecting all the documents in the box that is shown (the box 00 in the example). A detail information display key 1411 is used to check detail information of documents selected by using the document selection buttons 1406 to 1409, the select-all-documents button 1410, etc. When the user touches the detail information display key 1411, the CPU 123 displays the detail information of a selected document, as shown in FIG. 18.

A delete key 1412 is touched when deleting documents selected by the user by operating on the document selection buttons 1406 to 1409, the select-all-documents button 1410, etc. When the delete key 1412 is touched, the CPU 123 deletes the selected documents from the hard disk 6.

A move-document key 1413 is touched when moving documents selected by the user by operating the document selection buttons 1406 to 1409, the select-all-documents button 1410, etc., for example, to another box. When the move-document key 1413 is touched, the CPU 123 deletes the selected documents from the originating box and writes the selected documents to the destination box in the hard disk 6 so that the selected documents are moved to the selected destination box.

A read-document key 1415 is touched when reading a document from the reader unit 1. Where in the box the document is to be stored is specified by a document number. Thus, the document read by the reader unit 1 is stored in an area in the box as specified by the user. A close key 1416 is touched when returning to the box list screen 1300 shown in FIG. 12.

A print key 1414 is touched when printing documents selected by using the document selection buttons 1406 to 1409, the select-all-documents button 1410, etc. When the print key 1414 is touched, the CPU 123 displays a print setting screen 1600 as shown in FIG. 15.

Figure 15:
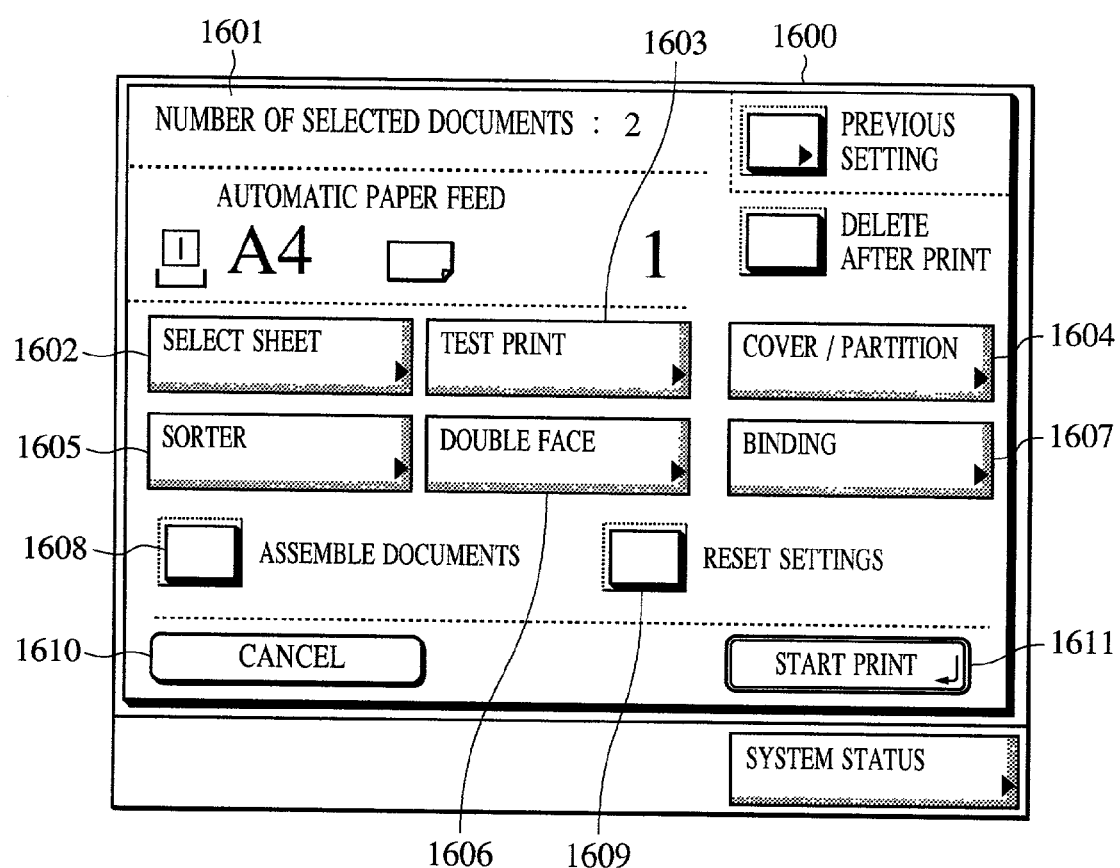
FIG. 15 is a schematic diagram showing an example screen of a touch panel in the operation unit shown in FIG. 11.

Referring to FIG. 15, the print setting screen 1600 is displayed when the print key 1414 shown in FIGS. 13 and 14 is touched.

In the print setting screen 1600, a number-of-selected-documents display field 1601 displays the number of selected documents. A sheet selection key 1603 is used to select a sheet for a print. A test print key 1603 is used to print only the first sheet as a test. When the test print key 1603 is touched, only the first page of an output is printed, and then, all the pages are printed in response to an instruction from the user. Also, if a setting for outputting a plurality of copies has been made, when the test print key 1603 is touched, only the first copy is printed, and then, the rest of the specified number of copies is printed in response to an instruction from the user.

A cover/partition key 1604 allows insertion of a cover and partition sheets. When the cover/partition key 1604 is touched, a cover and partition sheets are inserted from a sheet feeder specified by the user, for example, an inserter 222, into a print of the document.

A sorter key 1605 allows setting of sorter mode. A double-face key 1606 allows setting of double-face mode. A binding key 1607 allows setting of binding mode. A document assembly button 1608 allows, when a plurality of documents is selected by the user by operating the document selection keys 1406 to 1409, etc., on the document list screen 1400, specifying the plurality of documents to be assembled. For example, if two documents each having an odd number of pages are selected and if double-face mode or Nin1 mode is specified, when the document assembly button 1608 is touched, the CPU 123 assembles the two documents so that images of both of the documents will be printed on the same recording sheet. On the other hand, if the document assembly key 1608 is not touched and if a print of a plurality of documents is specified, the CPU 123 controls the print process so as to print different documents on different pages so that the image of one of the documents will not be printed on the same recording sheet as the images of the other documents.

A reset key 1609 is used to reset settings on the print setting screen 1600 to initial values. A cancel key 1610 is used to cancel settings on the print setting screen 1600 and return to the document list screen 1400 shown in FIG. 14. A print start key 1611 is touched when starting a print.

When the binding key 1607 is depressed by the user and a print instruction is issued, the resolutions, included in the image property information, of all the pages of the image data included in the documents selected by the user are checked. If only one document is selected, the resolutions of all the pages of the single document are checked, and if a plurality of documents is selected, the resolutions of all the pages in all the selected documents are checked. If the resolutions of all the pages of the selected document or documents are the same, the CPU 123 displays a sheet feeder selection screen 1700 shown in FIG. 16.

On the other hand, if the resolutions are not the same for all the pages, that is, if at least one page has a resolution different from that of the others, the CPU 123 displays a message saying, for example, "setting of the binding mode is inhibited because of disparity in the property (resolution) of the image data," and returns to the print setting screen 1600 shown in FIG. 15.

Figure 16:
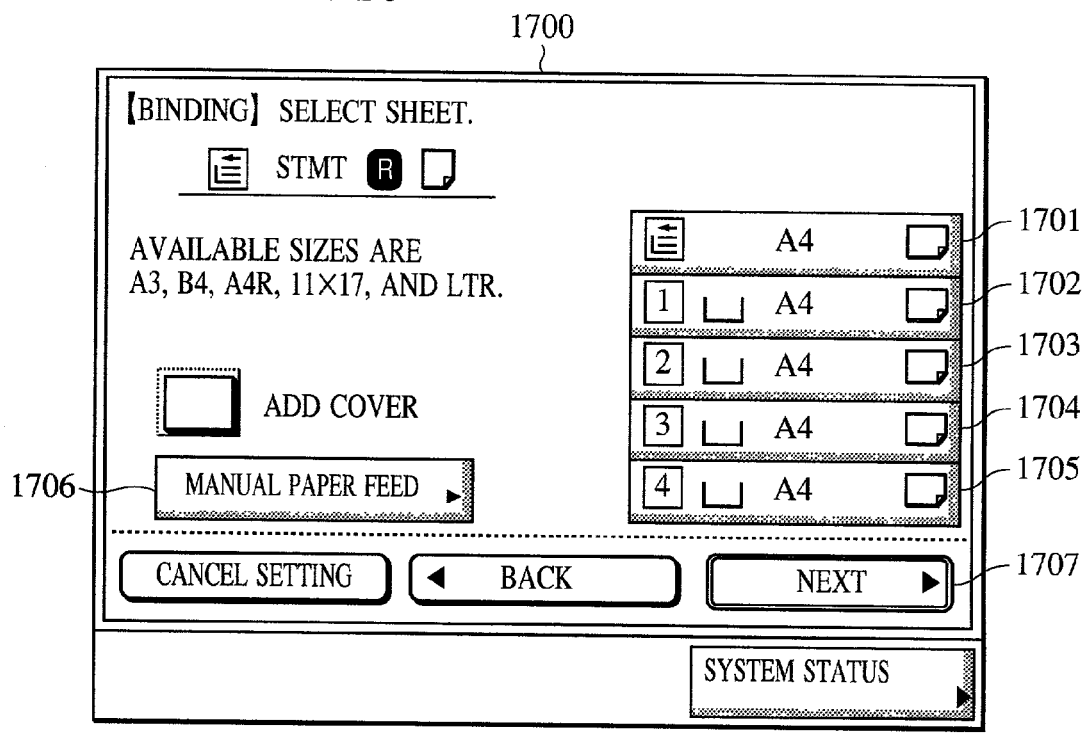
FIG. 16 is a schematic diagram showing an example screen of a touch panel in the operation unit shown in FIG. 11.

Referring to FIG. 16, in the sheet feeder selection screen 1700, selection keys 1701 to 1705 are used to select a sheet feeder so that a sheet to be used for a print can be selected. A manual feed key 1706 is used to specify that sheets be manually fed for a print. A next key 1707 is touched to switch to a saddle stitch specification screen 1800 shown in FIG. 17.

Figure 17:
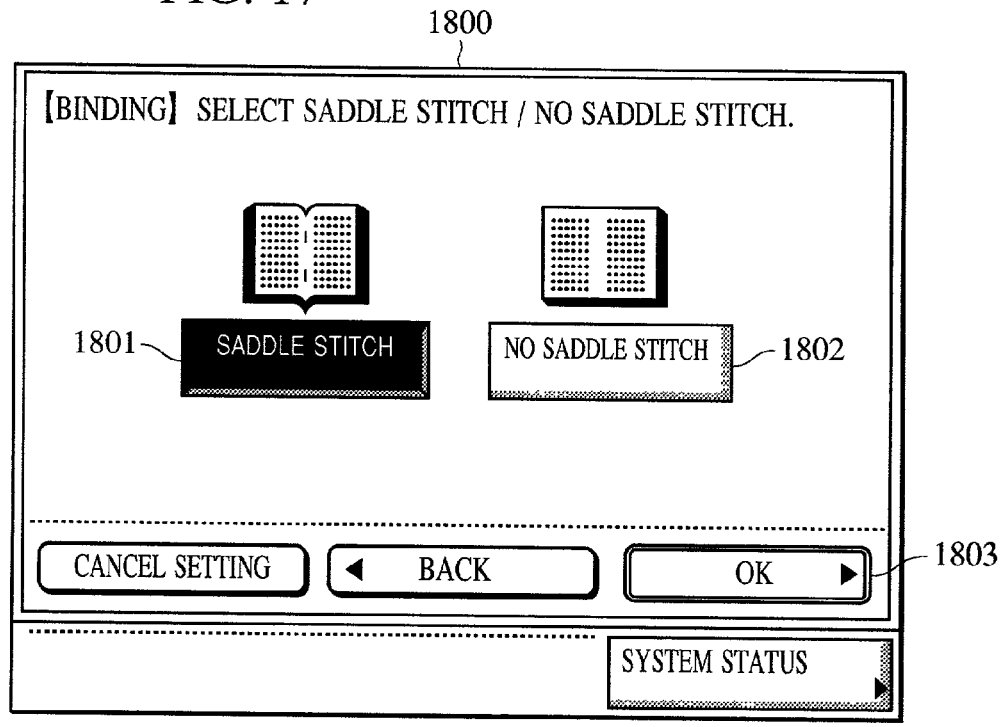
FIG. 17 is a schematic diagram showing an example screen of a touch panel in the operation unit shown in FIG. 11.

Referring to FIG. 17, in the saddle stitch specification screen 1800, a saddle-stitch key 1801 is used to specify execution of saddle stitching by a stapler of the saddle stitcher 225, and a no-saddle-stitch key 1802 is used to specify non-execution of saddle stitching. An OK key 1803 is touched when returning to the print setting screen 1600 shown in FIG. 15.

FIG. 18 shows a document detail information screen 1900, which is displayed by the CPU 123 when the detail information key 1411 shown in FIG. 13 is touched.

In the detail information screen 1900, a receipt number display field 1901 displays a receipt number. A receipt time display field 1902 displays the date and time when image data is stored in the box. A job type display field 1903 displays the type of the document. A job name display field 1904 displays the name of the document. A user name display field 1905 displays the user name of the document. A number-of-pages display field 1906 displays the number of pages of the document. A number-of-copies display field 1907 displays the number of copies of the document to be printed. A size display field 1908 displays the size of the document. A resolution display field 1909 displays the resolution of the document. A close key 1910 is touched when returning to the document list screen 1400 shown in FIG. 13.

A control process procedure of a binding layout method in the image forming apparatus according to the present invention will now be described with reference to a flowchart shown in FIG. 19.

Figure 19:
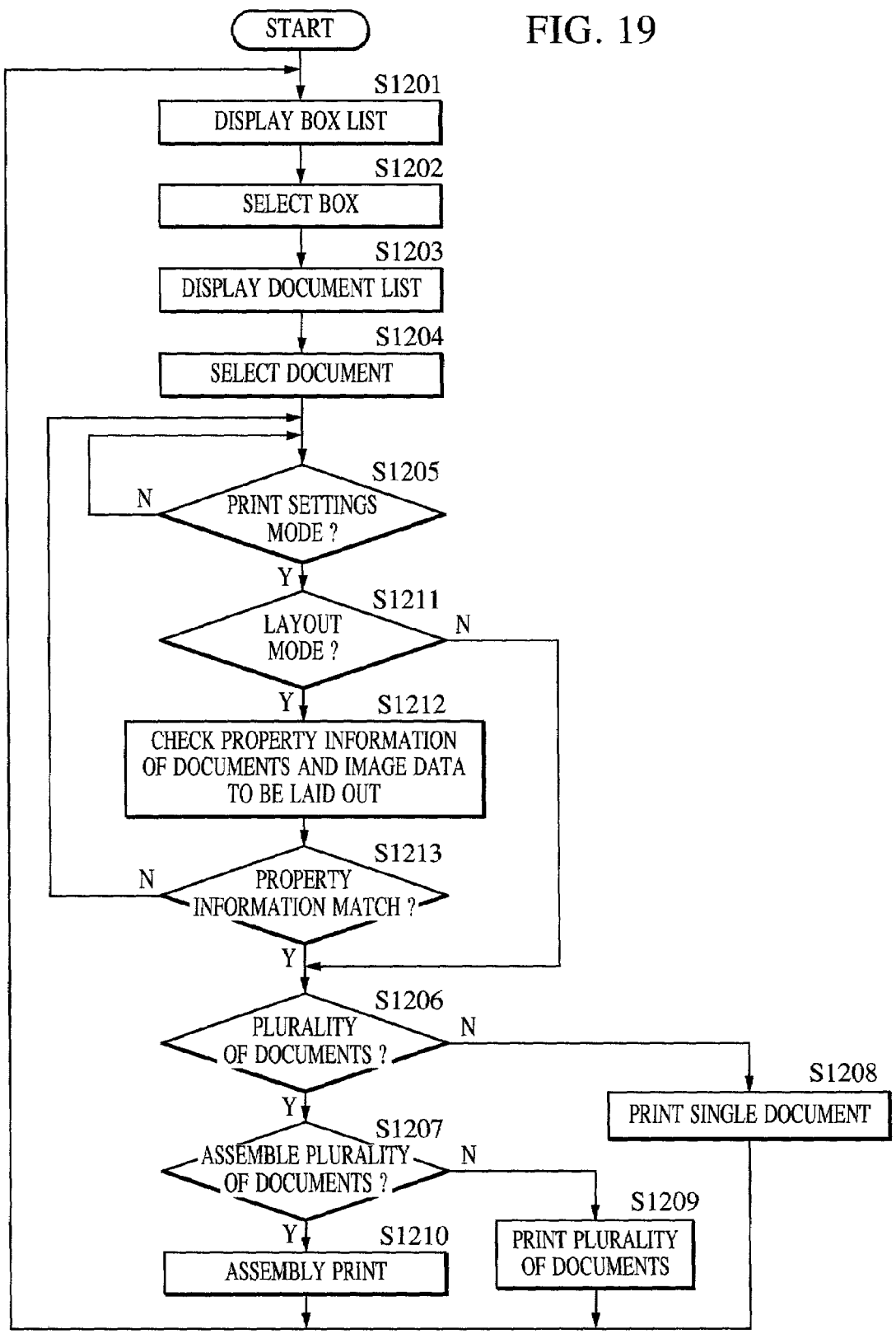
FIG. 19 is a flowchart showing an example of a third control process procedure in an image forming apparatus according to the present invention.

FIG. 19 is a flowchart showing an example of a third control process procedure in an image forming apparatus according to the present invention, that is, a control process procedure of a binding and layout method in an image forming apparatus according to the present invention. In FIG. 19, steps are indicated as S1201 to S1210, and the steps are executed by the CPU 123 shown in FIG. 3 according to programs stored in the memory 124.

First, in step S1201, when the box function selection key 805 of the operation unit 9 is depressed by a user, the box list screen 1300 shown in FIG. 13 is displayed. In the hard disk 6, a plurality of boxes with respective box names can be stored.

Then, in step S1202, the user selects one of the box selection buttons in the box list screen 1300, for example, the selection key 1301 associated with the box 00. Then, in step S1203, a document list screen 1400 shown in FIG. 13, corresponding to the selected box, is displayed. The document list screen 1400 shows a list of documents stored in the box selected in the box list screen 1300. Each box allows a plurality of documents to be stored therein.

Then, in step S1204, one or more desired documents are selected from the documents shown in the document list screen 1400 by a user. The document list screen 1400 allows the user to select a single document, a plurality of documents, or all of the documents as documents to be output. An example of the result of the selection is shown in FIG. 14, in which the document selection keys 1406 and 1408 are touched by the user so that a plurality of documents corresponding thereto is selected.

Then, when the print key 1414 in the document list screen 1400 is touched, the procedure proceeds to step S1205, in which the print setting screen 1600 shown in FIG. 15 is displayed, prompting the user to specify a print mode and parameters. When it is confirmed that print settings have been made by the user, the print settings the print settings are stored in the memory 124 in association with property information of the image data to be printed, and the procedure then proceeds to step S1211.

In step S1211, it is determined whether the job includes an instruction for execution in layout mode based on the user settings that have been made in step S1205, setting parameters stored in the memory 124, etc.

If it is found in step S1211 that the job includes an instruction for execution in layout mode (for example, when the binding key 1607 in the print setting screen 1600 is touched to set binding mode), the procedure proceeds to step S1212.

If it is found in step S1211 that the job does not include an instruction for execution in layout mode (for example, when a key other than the binding key 1607 in the print setting screen 1600 is touched to set a mode other than layout mode such as binding mode), processes in steps S1212 and S1213 to be described later are skipped, and the procedure directly proceeds to step S1206.

In step S1212, the property information of the document and the image data selected in step S1204 for layout is checked, that is, the resolutions of all the pages of the image data included in the documents selected in step S1204 are checked. When a single document is selected, the resolutions of all the pages in the single document are checked, and if a plurality of documents is selected, the resolution of all the pages in all of the plurality of documents are checked. Then, in step S1213, it is determined whether the resolutions for all the pages, included in the property information, coincide with each other.

If it is determined in step S1213 that the resolutions are not the same for all the pages, that is, if at least one page has a resolution different from that of the other pages, a message saying, for example, "setting of binding mode is inhibited because of disparity in the image property (resolution)" is displayed on the screen. The procedure then returns to step S1205, in which the print setting screen 1600 shown in FIG. 15 is displayed again, prompting the user to make print settings again.

On the other hand, if it is determined in step S1213 that the resolutions are the same for all the pages, the display is switched to the sheet feeder selection screen 1700 shown in FIG. 16. Then, the user selects a sheet feeder using the sheet feeder selection keys 1701 to 1705, the manual sheet feed key 1706, etc., and when the next key 1707 is touched, the display is switched to the saddle stitch specification screen 1800 shown in FIG. 17.

Then, the saddle-stitch key 1801 or the no-saddle-stitch key 1802 is touched for selection, and then the OK key 1803 is touched, returning to the print setting screen 1600 shown in FIG. 15.

When the print settings for the binding mode, etc., as the layout mode are complete, that is, when all the print settings are complete, in the print setting screen 1600, when the user touches the print start key 1611, the procedure proceeds to step S1206. Then, in step S1206, a print operation is started based on the user settings made in step S1205, the setting parameters stored in the memory 124 in association with the image data, etc.

In step S1206, it is determined whether a plurality of documents is selected. If it is found that a plurality of documents is selected, the procedure proceeds to step S1207, whereas if only a single document is selected, the procedure proceeds to step S1208.

In step S1208, the specified document is read from the hard disk 6 and sequentially printed. The print job is executed by generating the print job 505 and the image output job 401 described earlier and sequentially executing the processes.

In step S1207, it is determined whether an instruction has been given for assembling the selected plurality of documents, that is, whether the document assembly button 1608 shown in FIG. 15 is touched. If an instruction for assembling the plurality of documents has been made, the procedure proceeds to step S1210, and otherwise the procedure proceeds to step S1209.

In step S1209, the plurality of documents that has been specified is read from the hard disk 6 and sequentially printed. That is, the print job 505 and the image output job 401 are generated for each of the documents so that the documents are printed.

In step S1210, pages of the specified plurality of documents are sequentially output. That is, the print job 505 and the image output job 401 are generated so that the pages are printed. In this case, the totality of the pages included in the plurality of documents is processed as a single image output job.

As described above, according to this embodiment, when one or more documents stored in the image forming apparatus are output, output with binding layout can be inhibited with good operability if the resolution differs among pages.

Although step S1205 has been described as a step in which the resolutions of documents selected in step S1204 are checked, alternatively, whether the resolutions are the same may be checked in advance when documents are selected, so that if the resolutions are not the same, upon entering step S1205, the CPU 123 controls the display so as to shade or hide the binding key 1607 so that the binding key 1607 will not be used.

Furthermore, although the above description of the embodiment deals with a case where printing with binding layout is inhibited in step S1205 if the resolutions of the selected documents are not the same, similarly, all the modes mode in which a plurality of images is laid out and printed on a single face of a recording medium, such as 2in1 mode, are also inhibited.

If all the modes in which a plurality of images are laid out and printed on a single face of a recording medium is inhibited as described above, a mode in which a plurality of images are laid out on a single face of a recording medium may be exited so that a single image is printed on a single face of a recording medium.

Step S1205 may alternatively be such that printing in binding layout mode is controlled based on whether the number of pixels is the same for all the selected documents.

Furthermore, the property information may include, in addition to the number of pixels, information regarding color such as distinction between color image and black and white image, information regarding type of image such as size of image, etc. Accordingly, for example, the printer unit 2 is permitted to execute in binding mode if the pages of documents selected from the selected box for a print in binding layout are either all color images or all black and white images; whereas the printer unit 2 is inhibited from executing in binding mode if the pages include both color images and black and white images. Similarly, if the pages of printed in binding layout are different in size (e.g., A4 and A3), layout of the pages is inhibited, whereas if the pages are the same in size, printing in Nin1 mode is permitted. Furthermore, the CPU 123 may check the property information of image data based on instructions from a user input in association with image data to be printed when print settings are made, or based on the result of an analysis of properties of image data by an analysis unit.

As described above, according to this embodiment, whether or not to permit layout of a plurality of images to be arranged on a sheet is determined based on the image property information of the plurality of images (resolution, the number of pixels, color, size, etc.), permitting execution of layout if the image property is the same for all of the images; whereas if the image property is not the same for all of the pages, inhibiting execution of layout so that the printer unit 2 is inhibited from executing a layout so that the printer unit 2 will not record the images on a recording sheet, and a message to that effect is reported.

If the image property information is not the same for all of a plurality of sets of image data included in a job for which layout mode is specified, selected from a box that is selected from a plurality of boxes, the layout mode setting may be cancelled so that layout will not be performed, and the plurality of sets of image data that have been planned to be laid out may be printed by the printer unit 2 not on the same recording sheet but separately on different recording sheets in a different mode, for example, normal print mode (single-face print mode). Furthermore, the arrangement may be such that the user is allowed to select whether to inhibit printing by the printer unit 2 or to switch from layout mode to a different mode and to execute a print in that mode by the printer unit 2. In that case, when the user is notified that layout has been cancelled, the user is queried as to the selection, and one of the operations is selected according to the reply to the query. If the user selects to switch from layout mode to a different mode and to print a box document by the printer unit 2, the user may be requested to select a particular mode other than layout mode so that the printer unit 2 executes a print according to a reply from the user.

Layout modes include, for example, double-face mode in which images are formed on both faces of a sheet, Nin1 mode in which a plurality of images are formed on the same face of a sheet, Nin1 double-face mode in which a plurality of images are formed on each of the faces of a sheet, etc.

As described above, when a plurality of image data stored in the image forming apparatus is output in binding layout, with considerations to cases where the image property information including resolution differs among the plurality of image data, a layout can be performed at a low cost, and when layout is inhibited, the inhibition of layout is reported to the user in a readily understandable manner. Thus, a conversion circuit and a page memory for matching the image property information of all the image data before performing a layout are not required, so that excessive processes or additional cost will not be incurred. In addition, the image forming apparatus is prevented from operating at its own discretion to perform a layout by matching the image information property information of all the image data even if the user does not desire such an operation. The image forming apparatus is also prevented from outputting data not desired by the user. Furthermore, if a layout is inhibited for settings made by the user, a message to the effect is reported to the user so that the user will not be confused.

Thus, according to this embodiment, layout functions desired by users are provided without incurring excessive processes or additional cost, and ease of operation by the user is also improved.

Although the printer unit 2 (printer engine) has been described as laser beam type in the embodiments described above, the present invention may also be applied to other types of print method, including electrophotographic methods other than laser beam type, for example, LED type, and liquid crystal shutter type, ink-jet type, thermal transfer type, and sublimation type.

An image forming apparatus according to the present invention may also be applied to an arrangement in which the first embodiment and the second embodiment are combined.

Now, data processing programs that can be read by an image forming apparatus according to the present invention will be described with reference to a memory map shown in FIG. 20.

FIG. 20 shows a memory map of a storage medium storing data processing programs that can be read by an image forming apparatus according to the present invention.

Although not shown, the storage medium may also store information for managing the programs, such as version information and author, and information that is dependent on OS, etc., that reads the programs, for example, icons for identifying the programs.

Furthermore, data associated with the programs are also stored in the storage medium. Furthermore, if the programs and data to be installed are compressed, a decompression program may also be stored.

The functions shown in FIGS. 6, 9, and 19 may be implemented by programs installed from outside and executed by a host computer. In that case, information including the programs may be supplied to an output apparatus via a storage medium such as a CD-ROM, a flash memory, an FD, etc., or from an external storage medium via a network, and both of the cases are within the scope of the present invention.

As described above, it will be readily understood that the objects of the present invention can also achieved by supplying a storage medium storing program code of software for implementing the functions of the above-embodiments to a system or an apparatus so that a computer (CPU or MPU) in the system or the apparatus reads and executes the program code stored in the storage medium.

In that case, the program code read from the storage medium achieves the novel functions of the present invention, and thus the storage medium storing the program code constitutes the present invention.

The storage medium for storing the program code may be, for example, a floppy disk, a hard disk, an optical disk, a magneto-optical disk, a CD-ROM, a CD-R, a DVD-ROM, a magnetic tape, a non-volatile memory card, a ROM, an EEPROM, a silicon disk, etc.

Furthermore, similarly to achieving the functions of the above-described embodiments by a computer executing the program code, the functions of the above-described embodiments may be achieved by an OS (operating system), etc., running on the computer executing part of or all of the processes, which is also within the scope of the present invention.

Furthermore, the program code read from the storage medium may be written to a memory of an extension board inserted in the computer or an extension unit connected to a computer, so that the functions of the above-described embodiments are achieved by a CPU, etc., in the extension board or the extension unit executing part of or all of the processes, which is also within the scope of the present invention.

Furthermore, the present invention may be applied to a system constituted of a plurality of apparatuses or to a single apparatus. Furthermore, the objects of the present invention may be achieved by supplying programs to a system or an apparatus, which is also within the scope of the present invention. In that case, by reading the programs from a storage medium into the system or the apparatus, the system or the apparatus will enjoy the advantages of the present invention.

Alternatively, the programs of software for achieving the objects of the present invention may be downloaded from a database on a network by using a communications program into a system or an apparatus so that the system or the apparatus will enjoy the advantages of the present invention.

As described hereinabove, according to the present invention, when a visible image is to be formed and output on a sheet, based on image data that has been laid out in a layout process, if the resolution differs among sets of input image data, the layout process is inhibited. Accordingly, when a plurality of sets of image data stored in an image forming apparatus are output in binding layout, a layout can be performed at a low cost with considerations to cases where the resolution differs among the plurality of sets of image data.

Furthermore, when layout is inhibited, the inhibition of layout is reported to the user in a readily understandable manner.

Furthermore, when documents that are selected using document selection keys are printed with a layout, if the resolution differs among image data stored in a memory, the layout process is inhibited. Accordingly, when a plurality of sets of image data stored in an image forming apparatus are output in binding layout, a layout can be performed at a low cost with considerations to cases where the resolution differs among the plurality of sets of image data.

Furthermore, in box function mode, when a plurality of documents are selected from a box selected from a plurality of boxes in the hard disk 6 in the image forming apparatus, and an instruction is made so as to simultaneously print the plurality of documents with a layout, if the resolution differs among the sets of image data or among documents, the layout process is inhibited. Accordingly, when a plurality of sets of image data stored in an image forming apparatus are output in binding layout, a layout can be performed at a low cost with considerations to cases where the resolution differs among the plurality of image data. Furthermore, when layout is inhibited, the inhibition of layout is reported to the user in a readily understandable manner.

Furthermore, because whether or not to permit the layout process for a plurality of image data to be laid out in modes in which a plurality of images is formed on a single sheet (double-face print mode, Nin1 print mode, Nin1 double-face print mode, etc., and binding mode, pamphlet mode, etc.) is determined based on the image property information of the plurality of image data, when a plurality of sets of image data stored in the image forming apparatus are laid out on a single sheet, a layout can be performed at a low cost with considerations to cases where the image property information such as resolution, the number of pixels, the number of colors, size, etc., differs among the plurality of sets of image data.

Accordingly, when a plurality of sets of image data stored in an image forming apparatus are output in binding layout, a layout can be performed at a low cost with considerations to cases where the resolution differs among the plurality of sets of image data. Furthermore, when layout is inhibited, the inhibition of layout is reported to the user in a readily understandable manner.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:

input means for inputting a plurality of sets of image data;

layout means for laying out image data input by said input means;

image forming means for forming an image on a sheet based on image data that has been laid out by said layout means; and restricting means for restricting said layout means if the resolution differs among the plurality of sets of image data input by said input means.

2. An image forming apparatus according to claim 1, wherein said restricting means inhibits said image forming means from forming images of the image data that has been laid out by said layout means if the resolution differs among the plurality of sets of image data.

3. An image forming apparatus according to claim 1, wherein said restricting means inhibits said layout means from performing a layout if the resolution differs among the plurality of sets of image data, so that said image forming means forms an image without a layout.

4. An image forming apparatus according to claim 1, wherein said restricting means issues a notification to the effect that a restriction is imposed on layout by said layout means if the resolution differs among the plurality of sets of image data.

5. An image forming apparatus comprising:
   storage control means for storing input image data in storage means capable of storing a plurality of sets of image data;
   management means for managing image data stored in said storage means as a document;
   layout means for laying out a plurality of sets of image data stored in said storage means;
   image forming means for forming an image on a sheet based on the image data that has been laid out by said layout means;
   document selecting means for selecting a document stored in said storage means and managed by said management means;
   control means for controlling said layout means so as to lay out the document selected by said document selecting means and for controlling said image forming means so as to form an image, according to an instruction; and
   inhibiting means for inhibiting said layout means if the resolution differs among the plurality of sets of image data stored in said storage means and selected by said document selecting means for layout by said layout means.

6. An image forming apparatus according to claim 5, wherein said inhibiting means inhibits said image forming means from forming an image if the resolution differs among the plurality of sets of image data stored in said storage means and selected by said document selecting means for layout by said layout means.

7. An image forming apparatus according to claim 5, wherein said inhibiting means inhibits said layout means from performing a layout if the resolution differs among the plurality of sets of image data stored in said storage means and selected by said document selecting means for layout by said layout means, so that said image forming means forms an image without a layout.

8. An image forming apparatus according to claim 5, wherein said inhibiting means issues a notification to the effect that a layout by said layout means is inhibited if the resolution differs among the plurality of sets of image data stored in said storage means and selected by said document selecting means for layout by said layout means.

9. An image forming apparatus comprising:
   storage control means for storing input image data in storage means capable of storing a plurality of sets of image data;
   management means for managing image data stored in said storage means as a document;
   layout means for laying out a plurality of sets of image data stored in said storage means;
   image forming means for forming an image on a sheet based on the image data that has been laid out by said layout means;
   document selecting means that allows selection of a plurality of documents managed by said management means;
   control means for controlling said layout means to lay out the plurality of documents selected by said document selecting means and for controlling said image forming means to simultaneously print the plurality of documents, according to an instruction; and
   inhibiting means for inhibiting said layout means if the resolution differs among the plurality of sets of image data or documents stored in said storage means and selected by said document selecting means.

10. An image forming apparatus according to claim 9, wherein said inhibiting means inhibits said image forming means from forming an image if the resolution differs among the plurality of sets of image data or document stored in said storage means and selected by said document selecting means.

11. An image forming apparatus according to claim 9, wherein said inhibiting means inhibits said layout means from performing a layout if the resolution differs among the plurality of sets of image data or documents stored in said storage means and selected by said document selecting means, so that said image forming means forms an image without a layout.

12. An image forming apparatus according to claim 9, wherein said inhibiting means issues a notification to the effect that a layout by said layout means is inhibited if the resolution differs among the plurality of sets of image data or documents stored in said storage means and selected by said document selecting means.

* * * * *